United States Patent

[11] 3,587,088

[72] Inventor Peter A. Franaszek
Middletown, N.J.

[21] Appl. No. 692,544
[22] Filed Dec. 21, 1967
[45] Patented June 22, 1971
[73] Assignee Bell Telephone Laboratories, Incorporated
Murray Hill, Berkeley Heights, N.J.

[54] MULTILEVEL PULSE TRANSMISSION SYSTEMS EMPLOYING CODES HAVING THREE OR MORE ALPHABETS
4 Claims, 25 Drawing Figs.

[52] U.S. Cl. .......... 340/347, 325/38
[51] Int. Cl. .......... H03k 13/24, H04l 3/00
[50] Field of Search .......... 340/347 DD; 325/38, 38 A, 39, 41, 139, 32; 178/22

[56] References Cited

UNITED STATES PATENTS

| | | | |
|---|---|---|---|
| 3,233,236 | 2/1966 | Katzenstein et al. | 340/347 |
| 2,947,804 | 8/1960 | Eilers et al. | 325/32 X |
| 3,369,229 | 2/1968 | Dorros | 325/38 X |
| 3,411,089 | 11/1968 | Gicca | 178/22 X |
| 3,414,677 | 12/1968 | Quinlan | 325/38 X |

*Primary Examiner*—Maynard R. Wilbur
*Assistant Examiner*—Michael K. Wolensky
*Attorneys*—R. J. Guenther and E. W. Adams, Jr.

ABSTRACT: A binary pulse signal is converted for transmission into a pulse signal having N possible levels in accordance with a code having three or more alphabets with the input signal first divided into words of predetermined length and the words then encoded in accordance with each alphabet in accordance with the state of the transmitted signal at the conclusion of the transmission of the preceding word.

INVENTOR
P. A. FRANASZEK
BY Leonard J. Arnold
ATTORNEY

MULTILEVEL PULSE TRANSMISSION SYSTEMS EMPLOYING CODES HAVING THREE OR MORE ALPHABETS

BACKGROUND OF THE INVENTION

In order to accomplish the transmission of information over a digital transmission channel, the information to be transmitted must be encoded into a sequence of symbols suitable for transmission over the channel. A distinctive feature of any such coding is the set of requirements imposed by considerations such as channel characteristics and system operation. For example, in order to have effective regeneration it is necessary that the current or voltage amplitudes of the pulses and spaces not sag toward the average current, and to avoid such sag or drift of the centerline, as it is called, special pulse trains such as that disclosed in U.S. Pat. No. 2,996,578 which issued to F. T. Andrews, Jr., on Aug. 15, 1961, have been employed.

Because many such transmission systems also employ self-timed repeaters, these systems impose the further requirement that a pulse must be transmitted at least once during a predetermined interval of time. A first attempt to eliminate or induce the tendency of the center line of an irregular pulse train to wander or drift while at the same time eliminating the possibility of losing timing information due to the transmission of a long train of "0s" or spaces, is disclosed in U.S. Pat. No. 3,302,193 which issued to J. M. Sipress on Jan. 31, 1967. More sophisticated encoding techniques which accomplish the same results while at the same time reducing the bandwidth required for transmission are disclosed in U.S. Pat. No. 3,369,229 issued to I. Dorros on Feb. 13, 1968.

Thus, among the factors which influence the choice of a code are:

1. A special symbol sequence is often required to furnish timing information to the repeaters.
2. The channel may impose restrictions on the spectral shape of the sequence.
3. Provisions for monitoring the channel error rate during normal operation may be necessary.
4. Pulse sequence requirements must be satisfied for any binary sequence.

Requirement such as the above may usually be translated into limitations on the length of groups of like symbols, bounds on the running digital sum of the sequence, and specifications of sets of allowable transitions between symbols.

Heretofore, the codes employed have used a maximum of two alphabets, or sets, in order to accomplish encoding while satisfying the above mentioned requirements. Depending upon some predetermined characteristic of the transmitted signal, the binary signal to be transmitted is encoded in accordance with one or the other of the two codes. As a result of the use of two codes only a given number of the requirements outlined above can be met with a reasonably efficient code; efficiency of the code being defined as the number of bits transmitted to the number of information bits.

It is accordingly, an object of this invention to eliminate the inefficiency of transmission apparatus employing two alphabet codes while at the same time increasing the number of transmission system requirements which can be met by the code.

SUMMARY OF THE INVENTION

In accordance with this invention, a binary pulse signal is converted into a pulse signal having N possible levels in accordance with a code having three or more alphabets with the input signal first divided into words of predetermined length and the words then encoded in accordance with each alphabet in accordance with the state of the transmitted signal at the conclusion of the transmission of the preceding word. In a first embodiment of the invention, each of the alphabets contains code words of fixed length, while in a second embodiment, two of the alphabets contain variable length code words which permits greater flexibility in meeting the requirements stated above.

BRIEF DESCRIPTION OF THE DRAWINGS

This invention will be more fully comprehended from the following detailed description taken in conjunction with the drawings in which.

DETAILED DESCRIPTION

Figure 1:
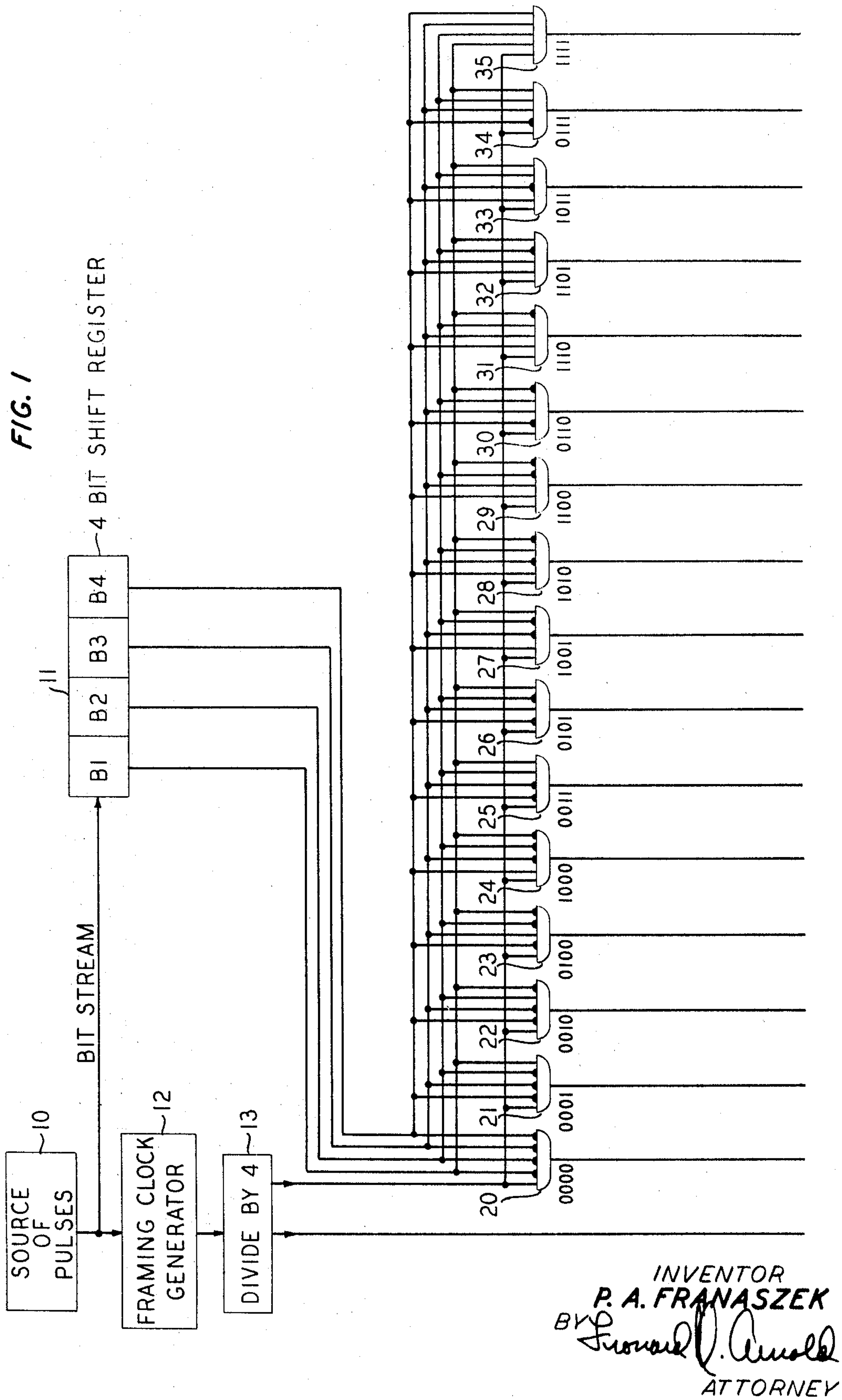
FIGS. 1, 2 and 3 arranged as shown in FIG. 20, are a block diagram of the transmitting terminal of a transmission system embodying this invention which transmits binary information by means of fixed length code words.

Binary pulse information from a source of pulses 10, as shown in FIG. 1, is to be transmitted over a pulse transmission system and it is desired that the transmitted signals have relatively little DC wander and a relatively large number of transitions. Toward this end, in accordance with this invention, the pulse signals from source 10 are divided into words of four bits each and encoded in accordance with a fixed length code in which each 4-bit word is transmitted as a 3-baud signal on the transmission line. The code employed uses three alphabets designated Alpha ($\alpha$), Mu ($\mu$) and Beta ($\beta$), respectively, with the $\alpha$ alphabet used when the DC sum value of the transmitted signal is "1," and the $\beta$ alphabet used when the DC sum value is "4" and the $\mu$ alphabet when the DC sum value is either "2" or "3." The entire code is shown below.

TABLE 1

| Binary equivalent | Alphabet for coder state $\alpha$ | $\mu$ | $\beta$ |
|---|---|---|---|
| 0000 | +−+ | +−+ | −−− |
| 0001 | +++ | −+− | −+− |
| 0010 | 0+0 | 0+0 | −0− |
| 0100 | +00 | +−− | +−− |
| 1000 | 00+ | 00+ | −−0 |
| 0011 | 0+− | 0+− | 0+− |
| 0101 | +0− | +0− | +0− |
| 1001 | ++0 | 00− | 00− |
| 1010 | +0+ | 0−0 | 0−0 |
| 1100 | 0++ | −−+ | −−+ |
| 0110 | +−0 | +−0 | +−0 |
| 1110 | −+0 | −+0 | −+0 |
| 1101 | −0+ | −0+ | −0+ |
| 1011 | 0−+ | 0−+ | 0−+ |
| 0111 | ++− | ++− | 0−− |
| 1111 | −++ | −++ | −00 |

As stated above, in order to accomplish the desired conversion, the incoming pulse signals from source 10 must first be divided into words of four bits each. To accomplish this, the incoming signals are first applied to a 4-bit shift register 11 which comprises four bistable circuits B1 through B4, each of which has an output terminal at which a reference voltage is present when the bistable circuit is in the set condition. Under reset conditions, a ground voltage is present at the output terminal. The bistable circuit is in the set condition when an input pulse or "1" is stored therein and is in the reset condition when a no pulse, or "0" is stored therein.

The 4-bit shift register 11 operates in conjunction with a framing clock generator 12 and a divide-by-four circuit 13 to divide the input signals into words of four bits each. The framing clock generator 12 is found at each terminal of a regenerative pulse transmission system such as that disclosed in U.S. Pat. No. 2,996,578 which issued to F. T. Andrews, Jr., Aug. 15, 1961, and by C. G. Davis on pages 1 through 24 of the Jan. 1962 issue of the Bell System Technical Journal.

Since the framing clock generator is connected to divide-by-four circuit 13, the output of the divider 13 consists of a pulse in every fourth time slot and this output signal is applied to one input terminal of a series of INHIBIT gates 20 through 35 to enable these gates during every fourth time slot generated by source 10.

Gates 20 through 35 generate at the end of each four bits of the received signal, a discrete signal at one of the 16 output terminals from these gates which indicates which of the 16 possible combination of received pulses and spaces is stored in the shift register. For example, assume that the first four bits received from source 10 are the bits 1110. The first received bit will be stored in bistable circuit B4 of register 11. The second received bit will be stored in bistable circuit B3 of register 11, and the third received bit will be stored in bistable circuit B2 of register 11. The bit received in the fourth time slot of the received signal will be stored in bistable circuit B1. Gate 31 is an INHIBIT gate having three input terminals and one inhibit terminal. Each of the three inputs terminals connected to the output terminal of the stages B4 through B2 while the inhibit terminal is connected to the output terminal of bistable circuit B1. As a result, when the input signal is 1110, gate 31 is enabled and produces an output signal. Similarly, each of the other 16 gates produces an output signal upon the occurrence of a predetermined "one" of the 16 possible words which can be received during four bits of the input signal. As a further example, gate 27 generates an output signal when the input signal is 1001. Since the gate 27 is enabled by the reference voltage present at the output terminals of the B1 and B4 bistable circuits, and no inhibiting voltage is applied to the inhibit terminals of gate 27 which are connected to the output terminals of the B2 and B3 bistable circuits. As a result, gate 27 generates an output signal when the received four bits are 1001. The address or input signal for which one of the 16 gates, 20 through 35, will generate an output pulse, is shown in FIG. 1 directly beneath that gate.

Figure 2:
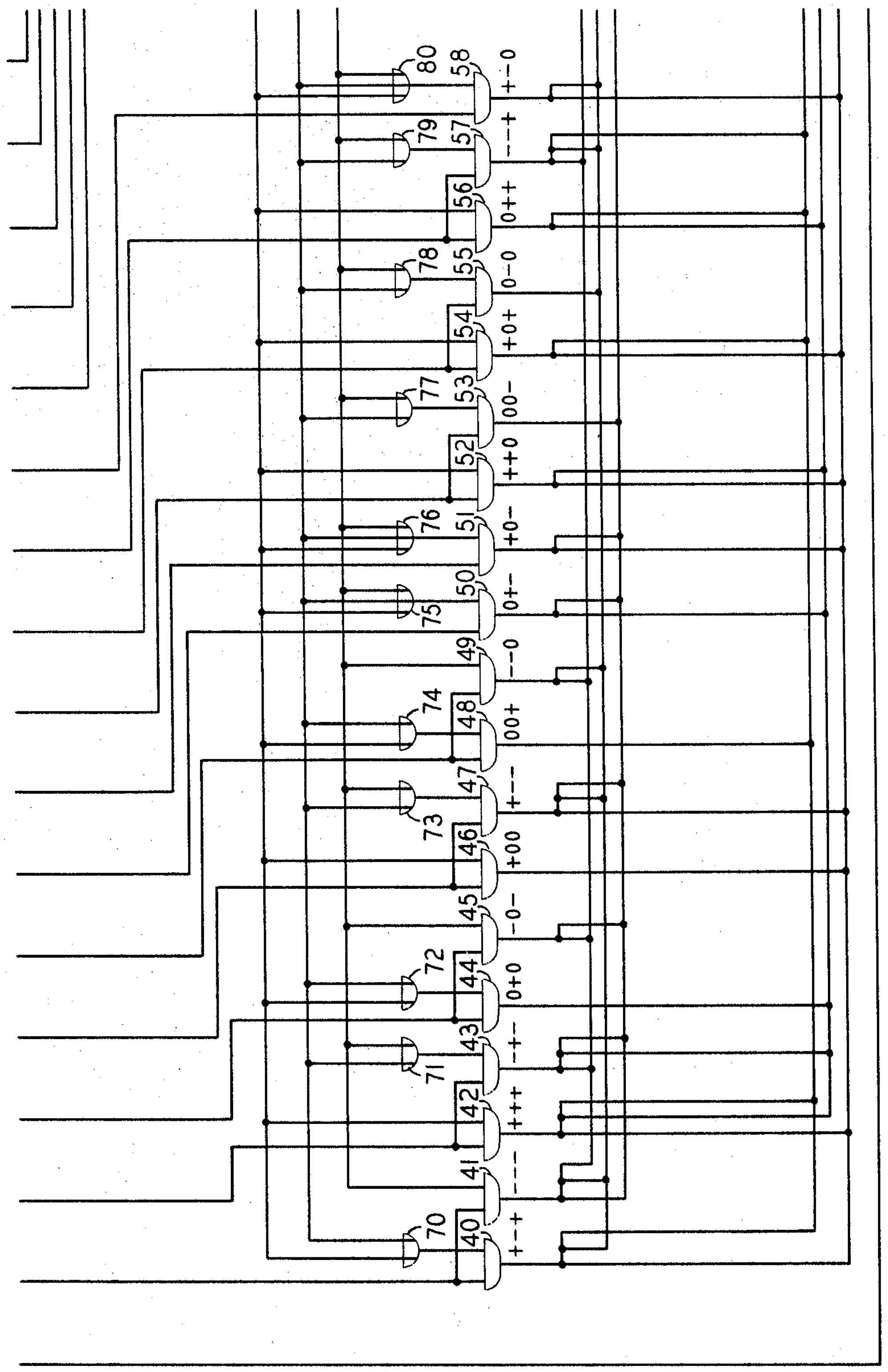
Figure 3:
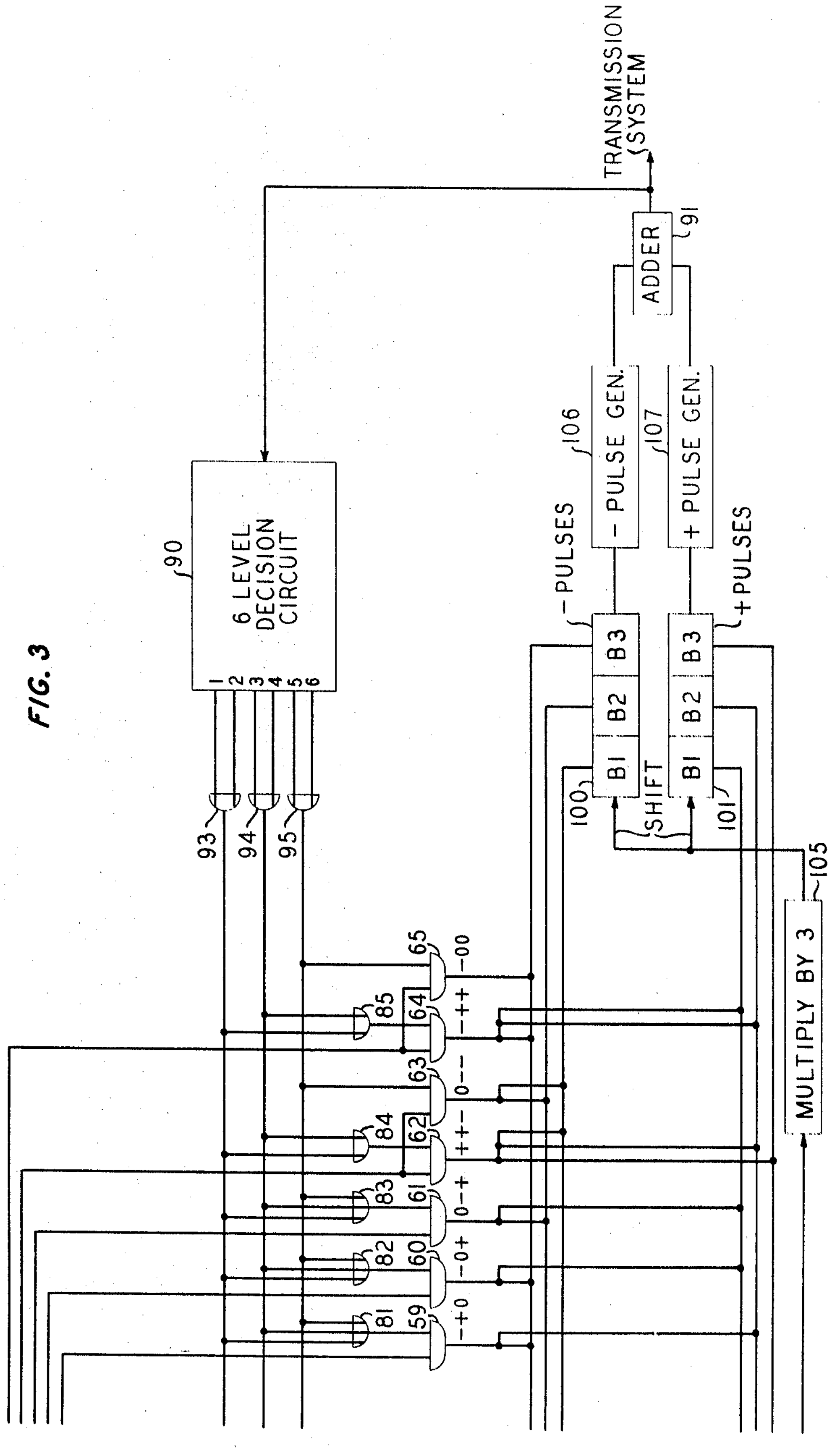

In order to encode each 4-bit word as determined by the output of one of the 16 gates, 20 through 35, additional logic circuitry comprising 26 AND gates, 40 through 65, and 16 OR gates, 70 through 85, together with a six-level decision circuit 90 such as that described in copending application Ser. No. 417,863 filed on Dec. 14, 1964, are required. These gates and associated circuits are shown in FIG. 2 and 3. The decision circuit 90 produces at one of its six output terminals a signal indicative of the magnitude of the DC level of the output signal from adder circuit 91 which circuit produces the signal actually transmitted on the transmission system. Whenever the transmitted signal has a DC level of one or two, an output signal is generated at the output terminals labeled one and two of the decision circuit 90. The first and second output terminals of the six-level decision circuit are connected to an OR gate 93 which produces an output signal to properly actuate those gates 70 through 85 and thereby enable those gates 40 through 65 so that the received 4-bit signal is encoded in accordance with the $\alpha$ alphabet shown in the table I above.

Similarly, the third and fourth output terminals of the decision circuit are connected to an OR gate 94 which produces an output signal to actuate those gates 70 through 85 and enable those AND gates 40 through 65 so that the received 4-bit word is encoded in accordance with the $\mu$ alphabet in the table shown above. Similarly, the fifth and sixth output terminals of the six-level decision circuit 90 are applied to OR gate 95 which generates an output signal to actuate those gates 70 through 85 and enable those gates 40 through 65 so that the four bits stored in register 11 are encoded in accordance with the $\beta$ alphabet of the code shown above.

The 26 gates, 40 through 65, generate six parallel output signals in response to the information stored in shift register 11. Three of these parallel signals are applied to a shift register 100 and three are applied to a shift register 101. The arrangement of the gates 40 through 65 is such that the signal stored in the shift register represents the 3-baud code words determined by the input signal and the particular alphabet employed, to encode that word in accordance with the level of the signal as specified in the table above.

Pulses which are to be transmitted as negative going pulses are stored in shift register 100, while pulses which are to be transmitted as positive going pulses are stored in shift register 101. In each alphabet of the code shown in the table I above, a positive going pulse is indicated with a plus (+) sign, and a negative going pulse with a negative (−) sign. To continue the illustrative example above, assume that gate 31 has produced an output signal in response to the reception of the bits 1110. The output signal from gate 31 is applied to enable AND gate 59 which receives signals from each of the OR gates 93, 94, and 95 at its other input terminal through OR gate 81. This means that AND gate 59 is enabled regardless of the level of the DC signal and it will produce an output at its output terminal in response to the signal received from gate 51. This is in accordance with the table above which shows that the word 1110 is encoded in the same format in the $\alpha$, $\mu$ and $\beta$ codes.

The word 1110 is encoded in each of the three codes as the 3-baud word −+0 and this is accomplished by applying the signal present at the output terminal of gate 59 to the third or B3 bistable circuit of register 100 and the B2, or second bistable circuit of register 101. The output of gate 50 sets these stages, but all the other stages of the shift register remain in the reset condition. The signals stored in shift registers 100 and 101 are read out of the shift registers in response to signals received from a multiply-by-three circuit 105 which produces three output pulses each time the divide-by-four circuit 13 generates an output pulse. The output signal from the multiply-by-three circuit 105 is used to shift the pulse information stored in the shift registers through the shift registers so that the pulses are applied to pulse generators 106 and 107. Pulse generator 106 generates a negative going pulse in response to each pulse read out of register 100. Pulse generator 107 generates a positive going pulse in response to each pulse read out of register 101. The gates 40 through 65 are so arranged that when a pulse is stored in stage B1 of register 100 no pulse is stored in stage B1 of register 101. Similarly, when a pulse is stored in stage B2 of register 100, no pulse is stored in stage B2 of register 101 and vice versa. Similar restrictions are placed on the signals stored in stages B3 of registers 100 and 101. As a result, during each baud determined by multiply-by-three circuit 105, pulses may not appear simultaneously at the outputs of both generators 23 and 25 and these outputs may, therefore, be added by adder 91 to produce the desired 3 baud code word for transmission.

The above explanation has considered only the generation of a 3-baud word in response to the reception of four bits which are encoded in like fashion in each of the three alphabets. As another example, consider the generation of a code word which is not encoded in the same manner in each of the three alphabets. Assume that the received word is 1000. In the $\alpha$ and the $\mu$ codes, this word is encoded as 00+. To accomplish this, INHIBIT gate 24 produces an output signal which is applied to gates 48 and 49. Gate 48 is enabled by the output signal from OR gate 74 whenever the input signal is at the first, second, third or fourth levels. Gate 49 is enabled whenever the output signal is at the fifth or sixth levels. As stated above, the input signal is to be encoded in accordance with the $\alpha$ and $\mu$ codes whenever the input signal is at the first, second, third and fourth levels, respectively, but is to be encoded in accordance with the code B when it is at the fifth or sixth levels. The actual signals corresponding to the input word 1000 are shown in the table above and by reference to that table, it can be seen that the output code word to be generated in accordance with the and $\mu$ code is 00+. In accordance with the $\beta$ code, the word ––0 is to be generated. Encoding in accordance with the $\alpha$ and $\mu$ codes is accomplished by gate 48 which produces an output signal which is applied solely to the B1 stage of shift register 101. All other stages of the shift registers 100 and 101 have "0s" stored therein so that when the shift registers are cleared by the action of multiply-by-three circuit 105, pulse generator 107 generates a positive going pulse in the third time slot of the three time slot, so that the word produced is 00+. On the other hand, if the six-level decision circuit produces an output signal at its fifth or sixth terminals, then AND gate 49 is enabled and it produces an output signal which is applied to the B3 and B2 stages of register 100. No signal is applied to any other stage of the shift registers. Therefore, when the shift registers 100 are pulses which cause generator 106 to generate two negative going pulses in the first 2 bauds of the 3-baud word. Since no pulse is stored in either register during the third baud, the third baud is a "0." Thus, the word is encoded in accordance with the $\beta$ alphabet of the code shown in the table above.

It should be understood by those skilled in the art that the above-described code is merely illustrative of one of a larger number of fixed length codes which may be designed to suit particular transmission system requirements. The particular code disclosed was designed to minimize DC wander while, at the same time, providing a sufficient number of pulses to facilitate the operation of the self-timed repeaters in the transmission system.

Figure 4:
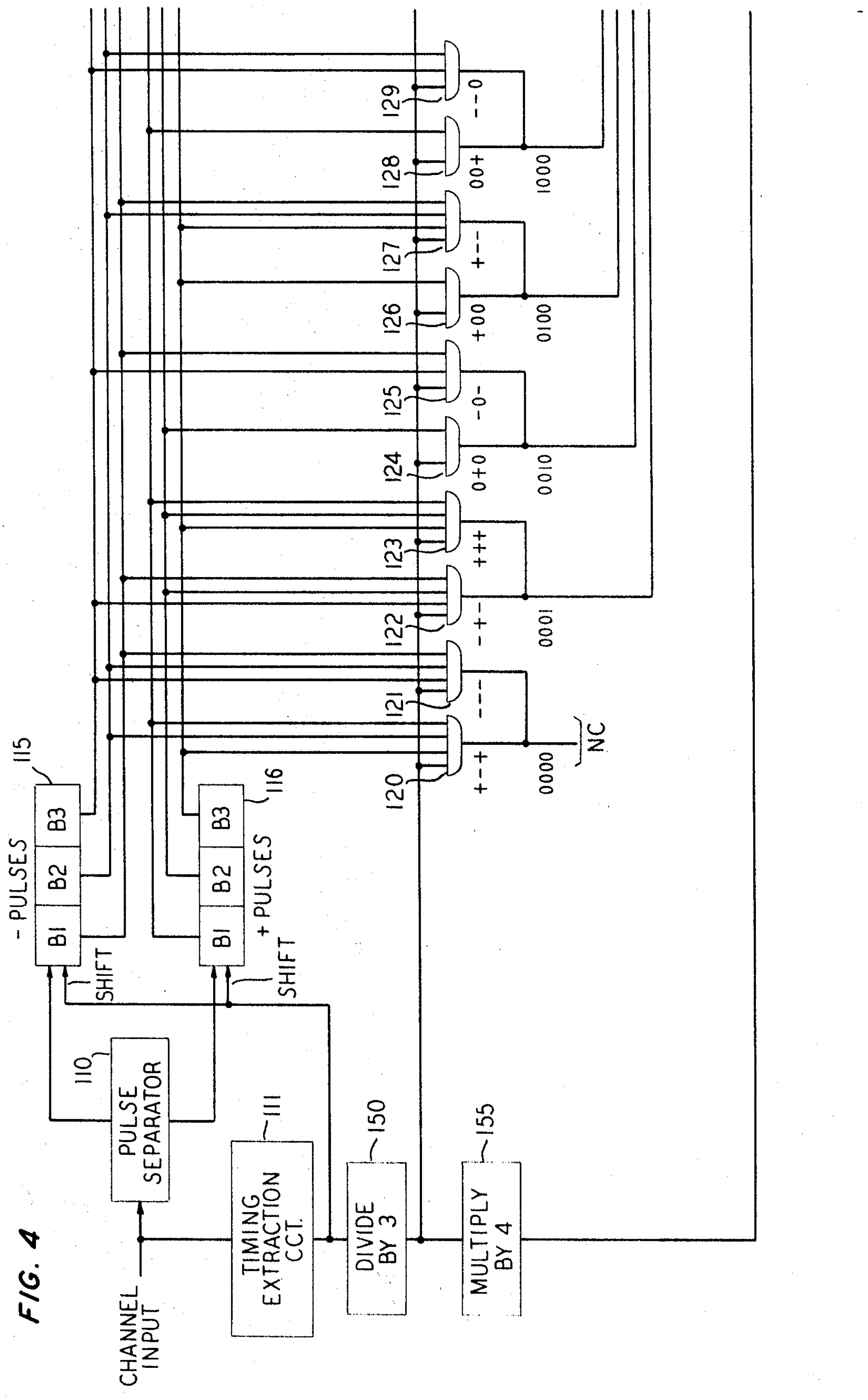
FIGS. 4 and 5 arranged as shown in FIG. 22, are a block diagram of the receiving terminal of a transmission system embodying this invention wherein binary information is transmitted by means of fixed-length code words.
Figure 5:
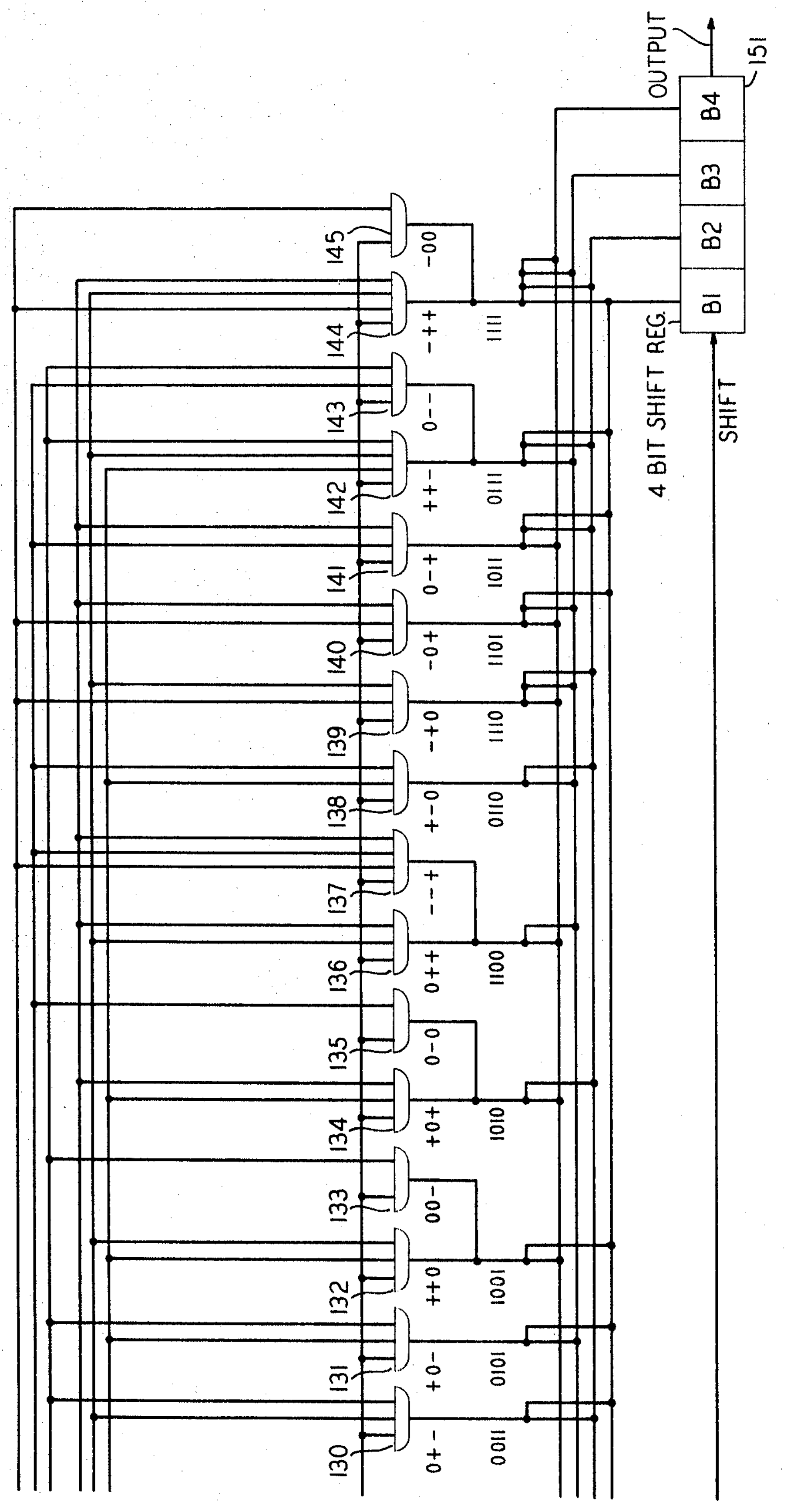
Figure 22:
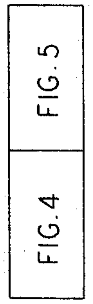

The receiving terminal of a system employing the code in the table above is shown in FIGS. 4 and 5, with these FIGS. arranged as shown in FIG. 22. The signals transmitted over the transmission system are applied to a pulse separator circuit 110 and also to a timing extraction circuit 111. The operation of the receiving apparatus is dependent upon timing information for its operation. The timing extraction circuit 111 generates pulses at the pulse repetition rate of the received signals. The extraction circuit 111 may comprise a tuned resonant circuit which is caused to oscillate by the transmitted signal at the pulse repetition rate thereof as described in U.S. Pat. No. 2,996,578, which issued to F. T. Andrews, Jr., on Aug. 15, 1961. The output of the timing extraction circuit 111 is applied to the shift terminal of each of a pair of shift registers 115 and 116. Under the action of the pulse separator 110, received negative going pulses are initially stored in B1 stage of register 115. Similarly, received positive going pulses are initially stored in the B1 stage of shift register 116. Under the control of the timing extraction circuit 111, the bits in the received signal are successively read from stage B1 through stage B2 to stage B3 so that after a 3 -bit transmitted word is received, any positive pulses present in that word will be stored in register 116 and negative pulses received in that word will be stored in register 115.

Each of the shift registers 115 and 116 have three output terminals at which a reference voltage will appear when a pulse of "1" is stored in its respective stage. The six output terminals are connected to the inputs of 26 gates which function to recognize the 26 possible words which may be transmitted in accordance with the code in the above table. These gates, 120 through 145, are enabled by the output from a divide-by-three circuit 150. The divide-by-three circuit has its input connected to the output of the timing extraction circuit 111 and generates a pulse upon the occurrence of every third output pulse from the timing extraction circuit. As a result, when a 3-bit transmitted word is stored in registers 115 and 116, gates 120 through 145 are enabled and one of them produces an output signal indicating which of the 26 possible words stored in registers 115 and 116 have been received.

As a specific example of the operation of gates 120 through 145, consider gate 124 whose sole input signal is derived from the B2 stage of shift register 116 which produces an output signal when a "1" is present in the second bit of the received code word. No other gate of the gates 120 through 145 will generate an output signal at that time, and so the output of gate 124 is a discrete output which is produced only when the signal 0+0 is transmitted. Similarly, gate 137 will produce an output signal when the word which is transmitted is ––+ because it is enabled by the output of divide-by-three circuit 150 and by the reference voltages present at the B3 and B2 output terminals of register 115 and the B1 output terminal of register 116.

Since the 26 received words represent only 16 possible transmitted words, the outputs of the gates 120 through 145 are combined as shown in the drawing prior to application to a four-stage shift register. Thus, for example, the word 0011 is represented by either the code word 0+0 or –0–. These two addresses are represented by the output signals from AND gates 124 and 125 so that the output terminals of these gates are directly connected together to a terminal which leads to the B2 stage of a 4-bit shift register 151. When the word 0010 is received no other signal is generated by any of the other gates, 120 through 145, so that the only signal inserted in the shift register is a reference voltage into the B2 stage of register 151. Whenever divide-by-three circuit 150 produces an output signal it is multiplied by a multiply-by-four circuit 155 which generates four pulses and applies them to the shift input terminal of register 151. As a result, the signals stored in shift register 151 are sequentially read out to the output terminal of the receiver. In the present example, the only reference voltage stored in shift register 151 was a reference voltage in the B2 stage so that the signal read out of the register 151 appears a 0010 since the B2 stage is read out following the readout of the B3 and B4 stages. As a result, the received code word is decoded by the apparatus and read out at the output terminal.

Consider as a second example, the transmitted word –00 and the transmitted word –++. Reference to the table above reveals that these two transmitted words represent the binary word 1111, with the word –++ being used in the $\alpha$ and $\mu$ alphabets and the word –00 being employed in the $\beta$ alphabet. These two possible transmitted words representing the binary 1111 are recognized by gates 144 and 145, respectively. The output signals from gates 144 and 145 are applied to all of the stages of the shift register 151 so that whenever gate 144 or gate 145 produces an output signal a reference voltage is inserted into each stage of the shift register 151 and a pattern of four consecutive "1s" is read out under the action of the multiply-by-four circuit 155.

Another example of a fixed-length code employing three alphabets is shown in the table immediately below.

TABLE 2

| Binary equivalent | A | B | C |
|---|---|---|---|
| 000 | +1–1 | +1–1 | +1–1 |
| 001 | –1+1 | –1+1 | –1+1 |
| 010 | –3+3 | –3+3 | –3+3 |
| 100 | +3–3 | +3–3 | +3–3 |
| 011 | –3+1 | –3+1 | +3+1 |
| 101 | +1–3 | +1–3 | +1+3 |
| 110 | –3–1 | +3–1 | +3–1 |
| 111 | –1–3 | –1+3 | –1+3 |

Each bit of a signal transmitted in accordance with the above code has only four possible levels, +3, +1, –1, –3. In addition, it may be demonstrated mathematically that at the end of each transmitted word the signal may have a DC level of either +3, +5 or +7, with the +3 level arbitrarily chosen as the lowest DC value and the seven level as the highest DC level. Such a code minimizes the variation in DC level of the transmitted signal and because two bits of information are transmitted for each group of 3-bit binary input words, more information is transmitted along the transmission line for a given line rate.

Figure 16:
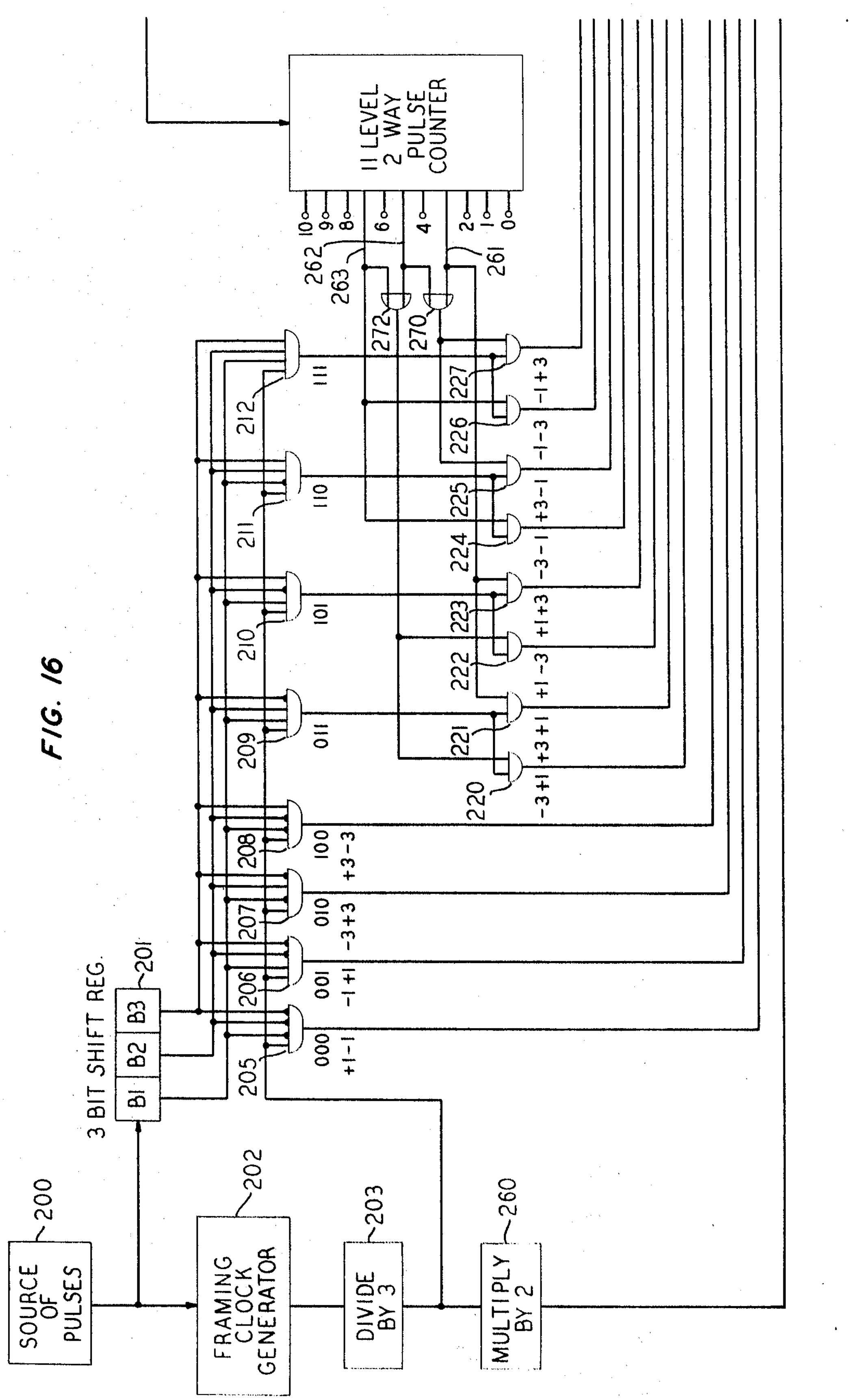
FIGS. 16 and 17 taken together with the drawings arranged as shown in FIG. 24 are a block diagram of a transmitting terminal embodying this invention for encoding binary signals in accordance with a fixed-length code.
Figure 17:
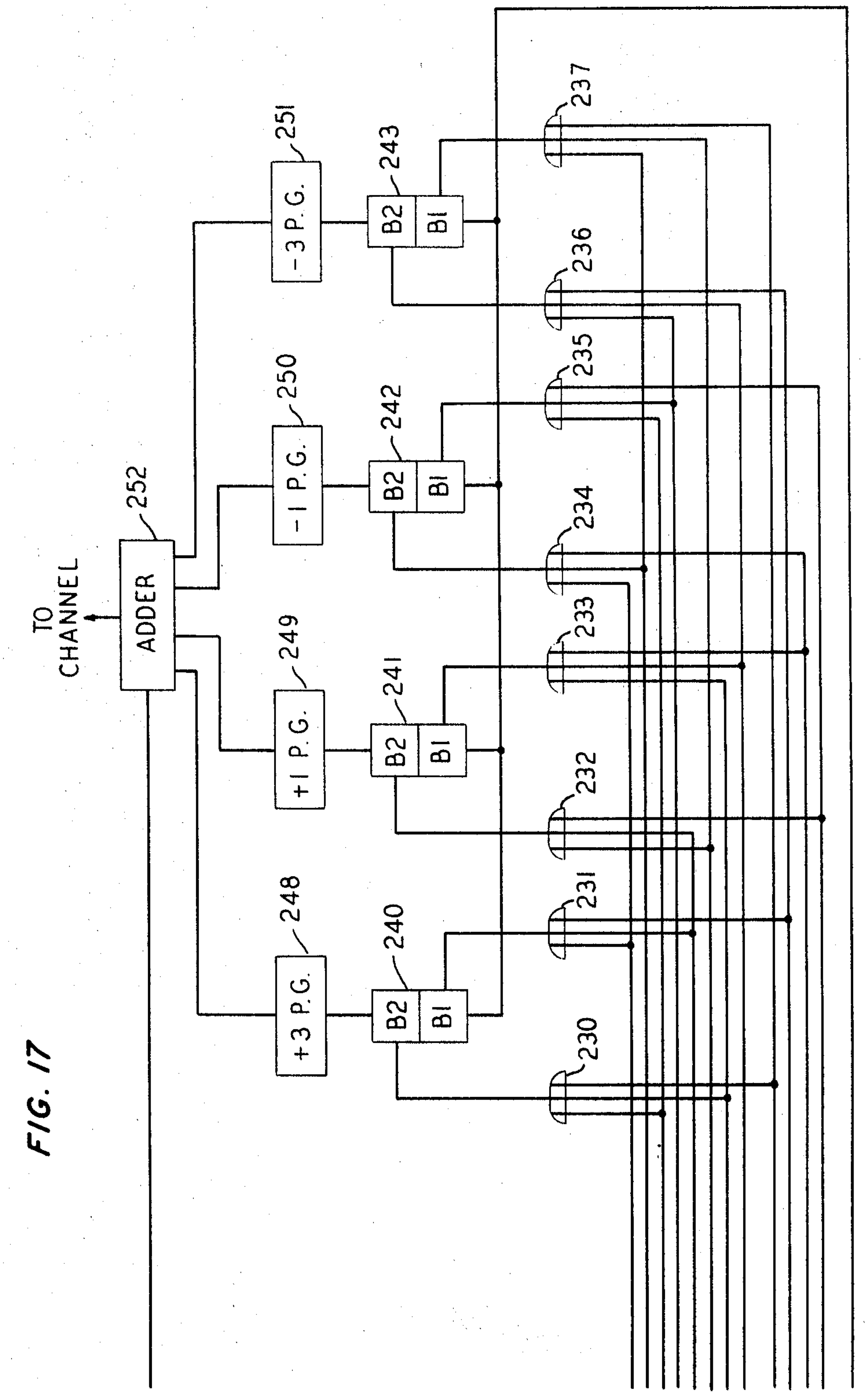

To accomplish encoding in accordance with the above code, the apparatus shown in FIGS. 16 and 17 are employed. The binary input signals from a source of pulses 200 are first divided into words of three bits each. To accomplish this, the incoming signals are first applied to a 3-bit shift register 201 which comprises three bistable circuits, B1 through B3, each of which has an output terminal at which a reference voltage is present when the bistable circuit is in the set condition and at which a ground voltage is present when the bistable circuit is in a reset condition. The bistable circuit is in the set condition when an input pulse or "1" is stored therein and is in the reset condition when no pulse or "0" is stored therein.

The 3-bit shift register 201 operates in conjunction with a framing clock generator 202 and a divide-by-three circuit 203 to divide the input signals into words of three bits each. Since the output of the framing clock generator is connected to the input of divide-by-three circuit 203, the output of the divider 203 consists of a pulse in every third time slot and this output signal is applied to one input terminal of a series of seven inhibit gates 205 through 211, and an AND gate 212, to enable these gates during every third time slot generated by source 200.

Gates 205 through 212 generate at the end of each three bits of the received signal, a discrete signal at one of their eight output terminals which indicates which of the eight possible combinations of received pulses and spaces is stored in the 3-bit shift register 201. The first received bit will be stored in bistable circuit B3 of register 201, the second stored in bistable circuit B2 of register 201 and the third stored in bistable circuit B1 of register 201. As an illustrative example of the operation of these gates, consider gate 207 which has two inhibit terminals connected to the output terminals of the B3 and B1 stages of shift register 201, and an input terminal connected to the output terminal of the B2 stage. When gate 207 is enabled by the output of divide-by-three circuit 203, an output signal will be generated by gate 207 only if the word stored in shift register 201 is 010, because the lack of a "1" stored in the B2 stage, or the presence of a "1" in either the B3 or B1 stages will result in no output signal. Thus, the output signal generated by gate 207 indicates the storage of the word 010 in register 201.

As another example, gate 211 generates an output signal when the word 110 is stored in register 201. The first two "1s" of the received word are stored in stages B2 and B3 and the "0" pulse is stored in stage B1. Since the output terminal of stage B1 is applied to the inhibit terminal of gate 211 and the output terminals B3 and B2 of register 201 are applied to input terminals of gate 211, gate 211 will generate an output signal only when the word 110 has been received.

In order to encode each 3-bit word as determined by the output of one of the eight gates, 205 through 212, additional logic circuitry comprising AND gates 220 through 227, OR gates 230 through 237, 270 and 272, shift registers 240 through 243, monostable multivibrators 248 through 251, and an adder circuit 252 are required.

The function of AND gates 220 through 227 in cooperation with gates 205 through 208, is to generate output signals which, when combined in the OR gates 230 through 237, produce output signals therefrom which, when stored in the registers 240 through 243, serve to cause the monostable multivibrators 248 through 251 to generate signals in accordance with the alphabets in the above table. More specifically, gates 205 through 208 generate output signals when the words 000, 001, 010 and 100, respectively, are received and stored in the shift register 201. Each of these words is encoded in exactly the same manner in each of the three alphabets of the code in the above table. To accomplish this, the output signal from gate 205 is applied to one input terminal of gates 232 and 235. The output signal from gate 206 is applied to one input terminal of gate 233 and one input terminal of gate 234. Similarly, the outputs from gates 207 and 208 are applied to the one input terminal of gates 231 and 236, and 230 and 237, respectively. When the word 000 is stored in register 201, the output of the divide-by-three circuit 203 causes gate 205 to generate an output signal which is transmitted through OR gate 232 which generates an output pulse which sets bistable circuit B2 of register 241. Further, in response to the signal generated by gate 205, a pulse is read into the B1 stage of shift register 242 by the output signal generated by OR gate 235.

The repetition rate of the transmitted signal is determined by a multiply-by-two circuit 260 which generates two output pulses in response to each pulse generated by divide-by-three circuit 203. In response to the first pulse generated by multiply-by-two circuit 260, the pulse stored in the B2 stage of register 241 excites monostable circuit 249 which generates an output pulse of one unit amplitude and applied it to adder 252. Also, in response to the first pulse generated by circuit 260, the pulse present in the B1 stage of register 242 is shifted to the B2 stage, and in response to the second pulse generated by circuit 260, the signal present in the B2 stage excites monostable circuit 250 which generates a pulse of −1 units of amplitude and applies it to the adder 252. As a result, the signal +1−1 is transmitted over the transmission line.

Gates 206 through 208 operate in the same manner as gate 205 since the code words which result in any of these gates producing an output signal are all encoded in the same form in each of the three alphabets.

AND gates 220 through 227 operate to encode those words which are encoded in different form in the different alphabets. The A alphabet is employed when the transmitted signal has a DC level of +7; the B alphabet is employed when the transmitted signal has a DC level of +5; the C alphabet is employed when the transmitted signal has a DC level of +3. In order to properly encode these words, it is essential that the DC level of the transmitted signal at the output of adder 252 be monitored. This is accomplished in accordance with this invention by an eleven-level, two-way pulse counter described in an article by B. W. Lucky entitled "Automatic Equalization for Digital Communication," Bell System Technical Journal, Apr. 1965, page 560, which has at least three output terminals 261, 262 and 263. When the DC level is at +3 a reference voltage is present at terminal 261; when the DC level is at +5 a reference voltage is present at terminal 262; when the DC level is at +7 a reference voltage is present at terminal 263. The signals present at terminals 261 and 262 are connected to an OR gate 270 whose output indicates that the signal is at the +3 or +5 level. Similarly, terminals 262 and 263 are connected to an OR gate 272 which produces an output signal whenever the transmitted signal is at the +5 or +7 output levels.

As an illustration of the operation of gates 220 through 227, consider the operation of gates 222 and 223 which serve to generate an output signal indicating that the word 101 is to be encoded as +1−3 in accordance with alphabets A and B or as +1+3 in accordance with alphabet C, depending upon the level of the transmitted signal. Gate 222 is enabled whenever the DC level of the transmitted signal is at +5 or +7 units by the output from OR gate 272, and will generate an output signal when gate 210 generates an output indicating that the word 101 is stored in register 201. The output signal from gate 222 is applied to OR gate 232 and OR gate 237. The output signal from OR gate 232 sets the B2 stage of register 241, while the output from OR gate 237 sets the B1 stage of register 243. The signal stored in registers 241 and 243 are sequentially read out under the control of the signal generated by circuit 260 so that monostable multivibrator 249 generates a pulse of +1 units amplitude in a first time slot of the transmitted signal, and monostable multivibrator 251 generates a pulse of −3 units amplitude in the second time slot. The resulting output signal from the adder 252 is +1−3 in accordance with alphabets A and B for the binary word 101.

If, however, the level of the transmitted signal was +3, then the word 101 is to be encoded as +1+3. AND gate 223 is enabled by the signal present at terminal 261 of the eleven-level counter and its output signal is applied to OR gates 231 and 232 with the result that the B1 stage of register 240 and the B2 stage of register 241 are placed in the set condition. As a result, monostable multivibrator 249 generates a pulse of +1 units of amplitude which is followed by the generation in the succeeding time slot of a pulse of +3 units of amplitude generated by monostable multivibrator 248. The remaining gates 220, 221 and 224 through 227, operate in similar fashion to generate the proper output signal in accordance with the code in the above table as determined by the level of the transmitted signal.

Figure 18:
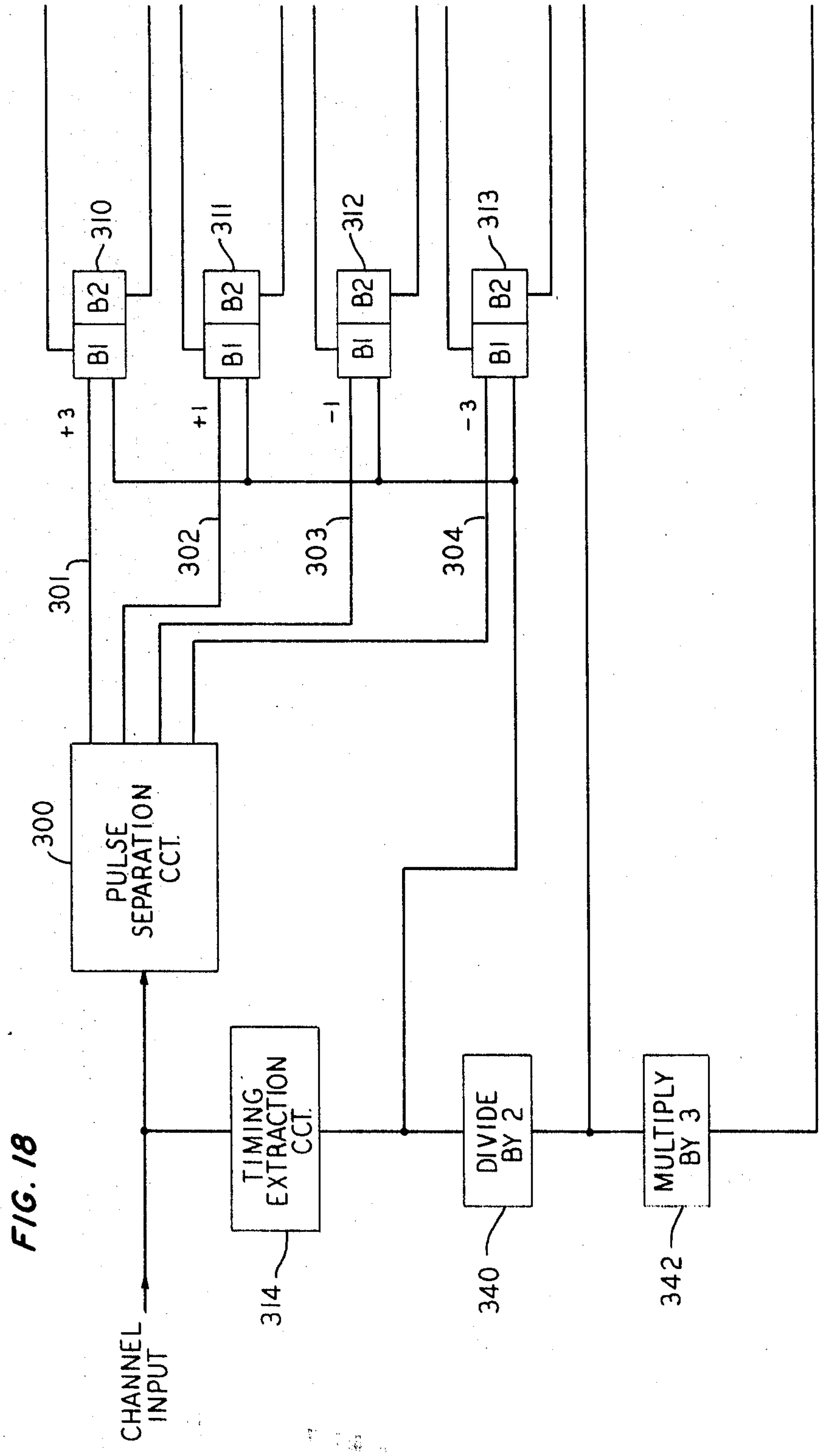
FIGS. 18 and 19 taken together with the drawings arranged as shown in FIG. 25 are a block diagram of a receiving terminal of a transmission system embodying this invention wherein binary information is transmitted by means of fixed-length codes.
Figure 19:
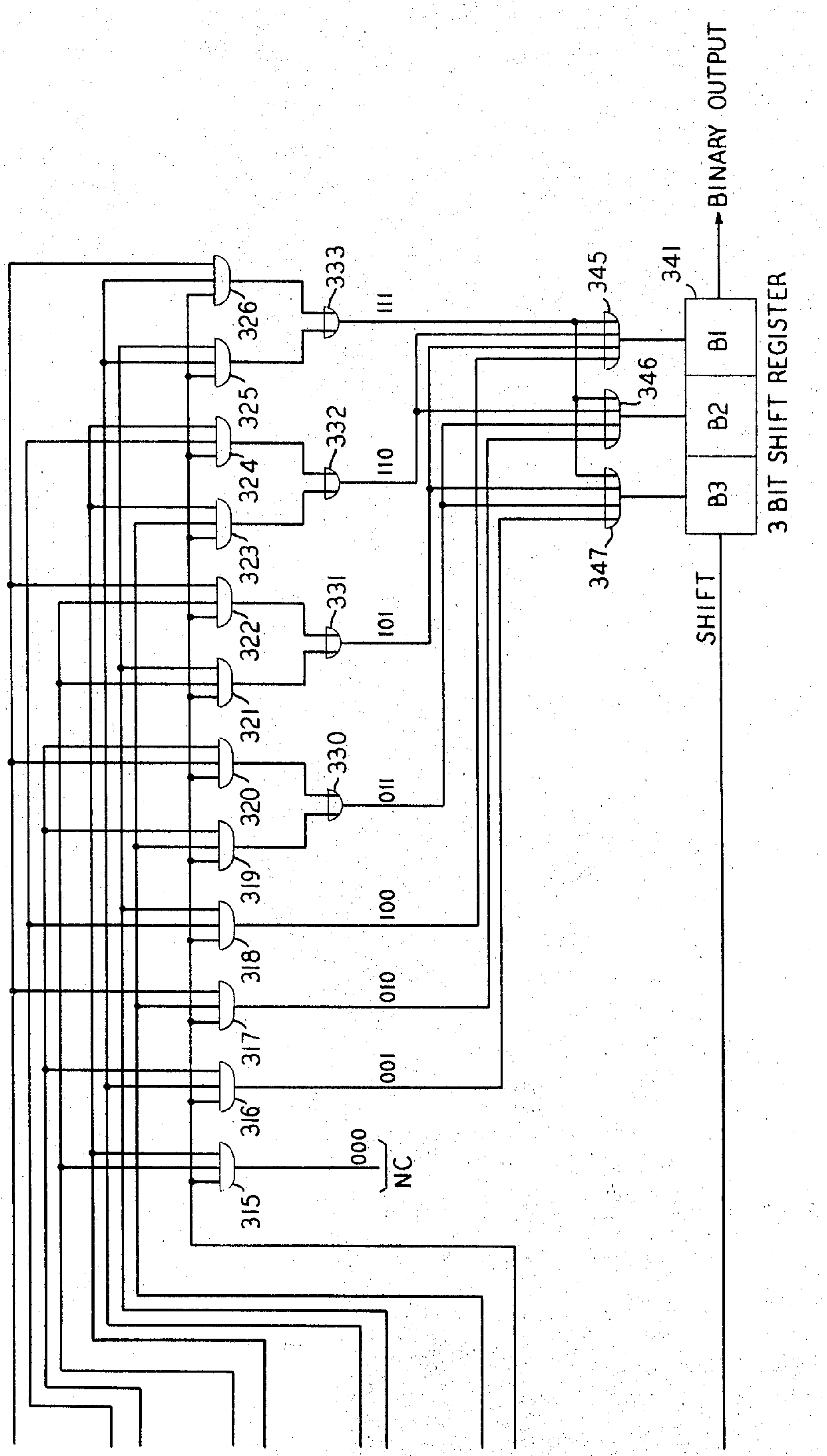
Figure 20:
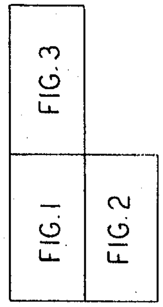
Figure 25:
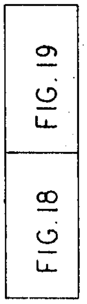

The receiving terminal of the second embodiment of a transmission system employing a fixed-length code is shown in FIGS. 18 and 19, with those FIGS. arranged as shown in FIG. 25. The output signal from the transmission system is applied to a pulse separation circuit 300 which has four output terminals. The pulse separation circuit generates at a first of its output terminals 301, a reference voltage, when an input signal of +3 units of amplitude is received. Similarly, terminals 302, 303 and 304 have reference voltages thereon when the received signal is a pulse of +1, −1 and −3 units of amplitude, respectively. Reference voltages at the output terminals of the separation circuit 300 are read into 2-bit stores 310 through 313 under the control of a timing signal derived by timing extraction circuit 314, and the output signals read out from these registers are applied to a series of 12 AND gates, 315 through 326, which, together with OR gates 330 through 333 operate to generate the eight possible 3-bit binary words which could be encoded for each 2-baud word transmitted in accordance with the table above.

For example, when the 2-baud word, +3−3 is received, a reference voltage in a first time slot is read into the B1 stage of register 310. During a second time slot, determined by timing extraction circuit 314, the pulse read into the B1 stage of register 310 is shifted to the B2 stage and a pulse is read into the B1 stage of register 313. The output of the timing extraction circuit 314 is applied to divide-by-two circuit 340 which generates one output pulse for every two pulses received from circuit 314. The output pulses from divide-by-two circuit 340 is applied to enable AND gates 315 through 326, and gate 318 produces an output signal since its two other input terminals are connected to the B1 stage of register 313 and the B2 stage of register 310. Thus, gate 318 generates an output signal when the word +3−3 is present and no other gate generates an output signal at that time. Gates 315 through 317 operate in a similar manner.

AND gates 319 through 326 and OR gates 330 through 333 function to generate a unique signal when a transmitted 2-bit word represents one of the four possible binary words which are encoded in different fashion in different alphabets. Thus, for example, the binary word 111 is encoded as −1−3 in the A alphabet, and as −1+3 in the B and C alphabets. When the word −1−3 is received it results in the presence of a reference voltage at the output terminal of the B2 stage of register 312 and the B1 stage of register 313. These two signals enable AND gate 325 which produces an output signal enabling OR gate 333 whose output signal indicates that the word 111 has been transmitted via the 2-baud code word. If the word 111 has been transmitted in accordance with codes B and C, the output terminal of the B2 stage of register 312 and the output terminal of the B1 stage of register 310 would have reference voltages thereon, thereby enabling AND gate 326 whose output signal is also transmitted through OR gate 333.

The output signals from AND gates 316 through 318 and from OR gates 330 through 333 are applied to a three-stage shift register 341, by means of OR gates 345 through 347. The shifting of the shift register 341 is governed by a signal generated by a multiply-by-three circuit 342 connected to receive the output signals from circuit 340. As a result, a 3-bit word is read out of shift register 341 for each 2-baud received words.

To continue the illustrative examples, the output of gate 318 indicating that the word 100 has been transmitted is applied only to OR gate 345 so that a reference voltage is read into the B1 stage and no voltage into any other stage. When circuit 342 has generated three shifting pulses, the binary output signal from register 341 will be the word 100 since no reference voltage is applied to either the B2 or B3 stages through OR gates 346 and 347. When gate 333 generates an output signal in accordance with the illustrative example above, it is applied through each of the OR gates 345 through 347 so that a reference voltage is applied to each stage of the shift register and the resulting signal read out of register 341 is then the code word 111.

A code employing not only three alphabets but, in addition, a special alphabet for the occurrence of certain predetermined input signal words is shown in the Tables 3 and 4 below. This code is identical to the code shown in FIG. 1 with the exception of the fact that the code words in the $\alpha$ alphabet for the binary word 0001 and the code word in the $\beta$ alphabet for the binary word 0000 have been eliminated. Instead of generating three symbol code words for these words as was done in the manner described above, a code word is generated which also takes into account the next four bits of the binary signal. Table 4 below shows the 16 possible words that can be present when the first four bits of the binary signal are 0001 and 0000, respectively. The resulting $\alpha$ and $\beta$ alphabets are also shown and the operation of the code shown in Table 4 can best be briefly illustrated by the use of two examples.

TABLE 3

| | Alphabet for coder state | | |
|---|---|---|---|
| Binary equivalent | $\alpha$ | $\mu$ | $\beta$ |
| 0000 | +−+ | +−+ | −−− |
| 0001 | +++ | −+− | −+− |
| 0010 | 0+0 | 0+0 | −0− |
| 0100 | +00 | +−− | +−− |
| 1000 | 00+ | 00+ | −−0 |
| 0011 | 0+− | 0+− | 0+− |
| 0101 | +0− | +0− | +0− |
| 1001 | ++0 | 00− | 00− |
| 1010 | +0+ | 0−0 | 0−0 |
| 1100 | 0++ | −−+ | −−+ |
| 0110 | +−0 | +−0 | +−0 |
| 1110 | −+0 | −+0 | −+0 |
| 1101 | −0+ | −0+ | −0+ |
| 1011 | 0−+ | 0−+ | 0−+ |
| 0111 | ++− | ++− | 0−− |
| 1111 | −++ | −++ | −00 |

TABLE 4

| When first four bits are 0001 binary equivalent | $\alpha$ alphabet | When first four bits are 0000 binary equivalent | $\beta$ alphabet |
|---|---|---|---|
| 00010000 | −+−+−+ | 00000000 | −−−+−+ |
| 00010001 | +++−+− | 00000001 | +−+−+− |
| 00010010 | −+−0+0 | 00000010 | +−+−0− |
| 00010100 | −+−+00 | 00000100 | 000+−− |
| 00011000 | −+−00+ | 00001000 | +−+−−0 |
| 00010011 | +++−0− | 00000011 | −−−+0+ |
| 00010101 | +++−−0 | 00000101 | −−−++0 |
| 00011001 | −+−++0 | 00001001 | +−+00− |
| 00011010 | −+−+0+ | 00001010 | +−+0−0 |
| 00011100 | −+−0++ | 00001100 | +−+−−+ |
| 00010110 | 000++− | 00000110 | 000+−0 |
| 00011110 | 000−+0 | 00001110 | 000−−+ |
| 00011101 | +++−−+ | C0001101 | −−−++− |
| 00011011 | +++−00 | 00001011 | −−−+00 |
| 00010111 | −+−++− | 00000111 | +−+0−− |
| 00011111 | 000−++ | 00001111 | +−+−00 |

First, consider that the binary word 0001 is received and the DC sum value of the signal is "1" so that the transmitted signal is encoded in accordance with the $\alpha$ alphabet of Table 4. If the next four bits of the binary signal are 0100, then, in accordance with the $\alpha$ alphabet of Table 4, the two groups of binary words are encoded as −+−+00. As another example, where the binary word 0000 is received and the sum value is four, then the received signal is to be encoded in accordance with the $\beta$ alphabet of Table 4. If the next four bits contain the word 111, then in accordance with the $\beta$ alphabet of Table 4, the 2-bit binary words are encoded as +−+−00.

The code shown in Tables 3 and 4 above, has a number of very desirable properties which distinguish it from the code described above and shown in Table 1. Like that code it is efficient in that more bits of the binary signal are transmitted per baud of the transmitted signal. Specifically, four bits of the binary signal are transmitted in 3 bauds of the transmitted signal. In addition, however, it eliminates large variations in the density of transmitted pulses while maintaining a relatively high density. Furthermore the variation in direct current level is reduced. Apparatus employing these codes accomplishes these very desirable results with a minimum increase in complexity of the equipment.

Figure 21:
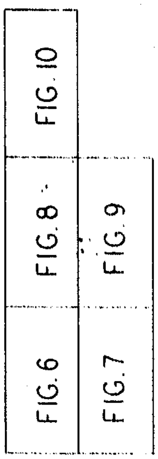

The transmitting apparatus is shown in FIGS. 6, 7, 8, 9 and 10 with the FIGS. arranged such as shown in FIG. 21. Pulse signals from a source of pulses 400 are first divided into words of four bits each. To accomplish this, the incoming signals are applied to an eight-stage shift register 401 which comprises eight bistable circuits B1 through B8 with the signals from source 400 initially read into stage B1 and then shifted sequentially through the other stages to stage B8. Each of the stages has an output terminal at which a reference voltage is present when the bistable circuit is set. Under reset conditions a ground voltage is present at the output terminal. The bistable circuit is said to be in the set condition when an input pulse or "1" is stored therein and in the reset condition when no pulse or "0" is stored therein.

A framing clock generator 402 operates in conjunction with divide-by-four circuit 403 to divide the input signals into words of four bits each. The output of divide-by-four circuit 403 consists of a pulse in every fourth time slot and this output signal is applied to a series of INHIBIT gates 420 through 435. Gates 420 through 435 are connected to receive the signals from stages B1 through B4 of shift register 401 and correspond to gates 20 through 35 in FIG. 1 so that these gates generate at their output terminals a signal which indicates which of the 16 possible combinations of received pulses and spaces is stored in the shift register.

Figure 6:
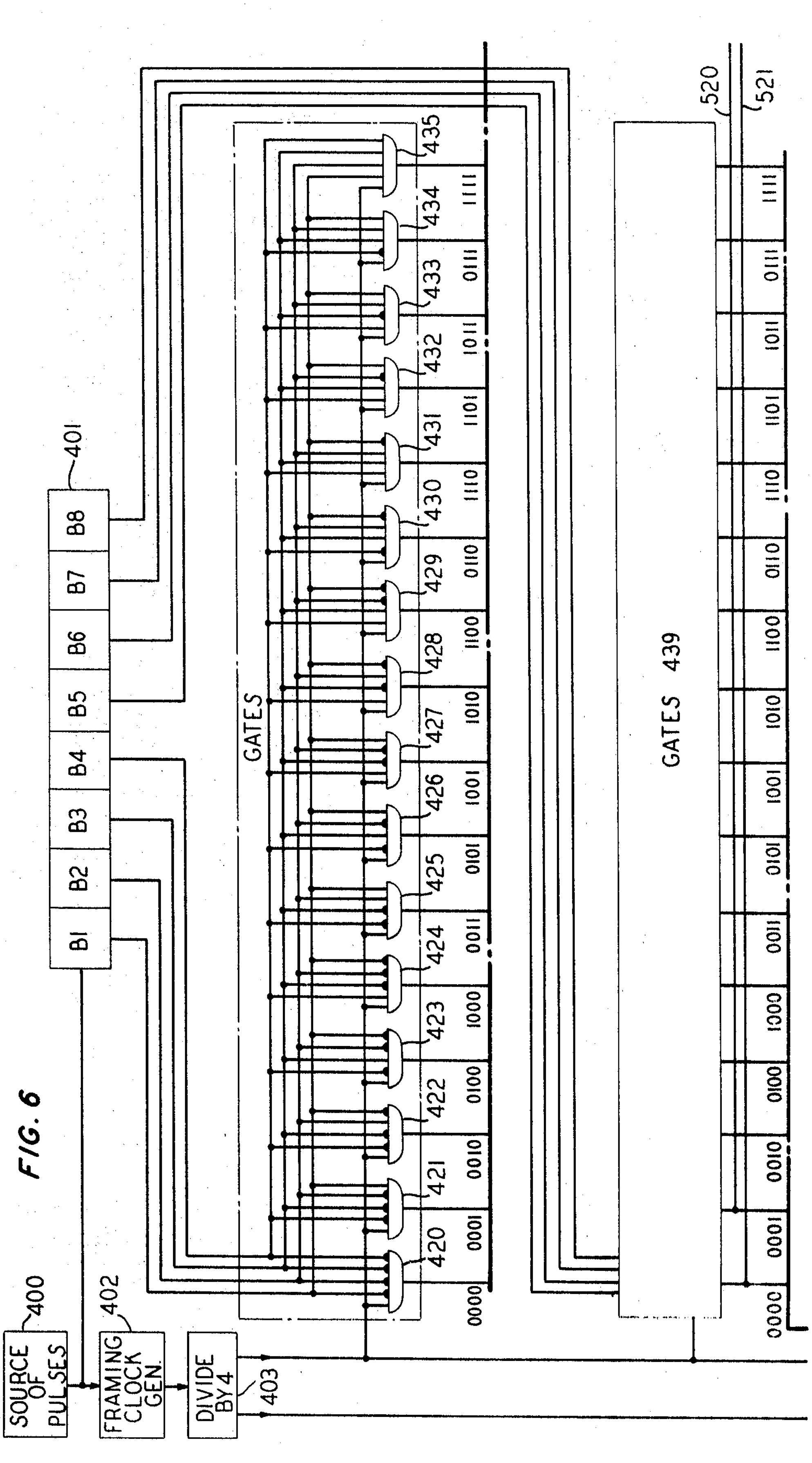
FIGS. 6, 7, 8, 9 and 10 taken together with the FIGS. arranged as shown in FIG. 21, are a block diagram of the transmitting terminal of a transmission system embodying this invention which transmits binary information by means of variable-length code words.
Figure 7:
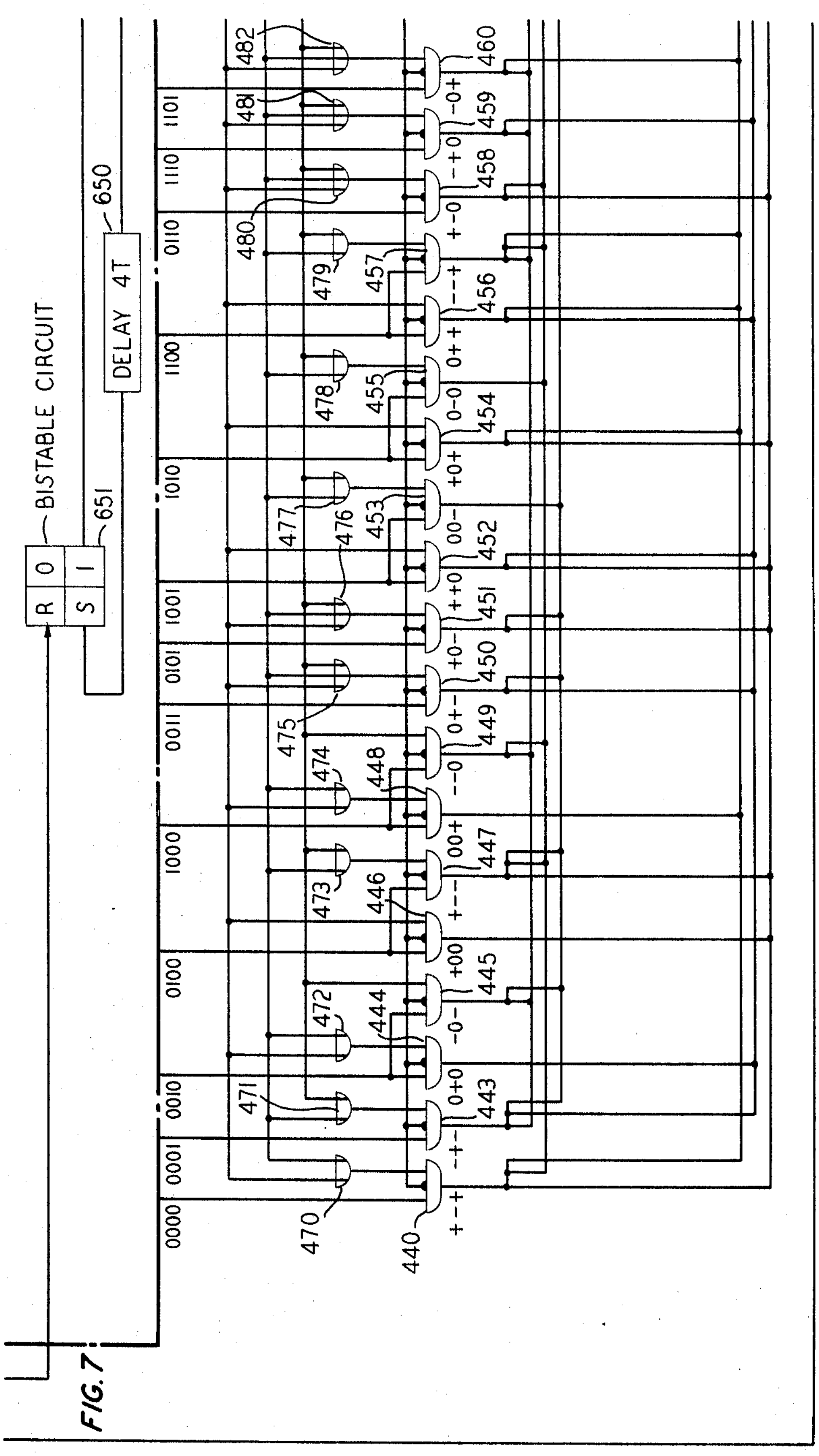

A second group of gates designated in FIG. 6 as gates 439 and identical in their arrangement to gates 420 through 435 are connected to receive the signals from stages B5 through B8 of register 401. Thus, gates 439 function to generate a discrete signal at one of 16 output terminals which indicate which of the 16 possible combinations of received pulses and spaces are stored in stages B5 through B8 of register 401.

When encoding, is to be accomplished in accordance with Table 3, it is carried out under the control of the output signals from gates 439 which are applied to logic circuitry comprising 24 AND gates 440, and 443 through 465, and 16 OR gates 470 through 485. These gates are identical in their operation to gates 40, 43 through 65, and 70 through 85 shown in FIGS. 2 and 3, with the sole exception of the fact the present code has only five possible levels and the gates previously enabled by the first and second levels are now enabled at the "0" and 1st levels, the gates previously enabled at the third and fourth levels are now enabled at the second level and the gates previously enabled at the fifth and sixth levels are now enabled at the third and fourth levels.

The AND gates 440 through 465 are connected to two shift registers 500 and 501 whose outputs, in turn, are connected positive and negative pulse generators 506 and 507, respectively for application to an adder 510 whose output terminal is connected to the transmission line. A multiply-by-three circuit 505 is connected to receive the signals from divide-by-four circuit 403 and a five level decision circuit 490 which ascertains the DC level of the transmitted signal is connected to the output adder 510. The operation of circuits 500, 501, 506, 507, 510, 490 and 505 are identical to the operation of corresponding circuitry shown in FIG. 3 having a reference numeral exactly 400 numbers less as shown in FIG. 3. The only difference in this circuitry is that there are no gates in FIG. 7 corresponding to gates 41 and 42 in FIG. 2 since these gates produce an output signal to generate the three-symbol words, −−− and +++ in the $\beta$ and $\alpha$ alphabets, respectively, and these words are not generated in accordance with the present embodiment of the invention.

Figure 8:
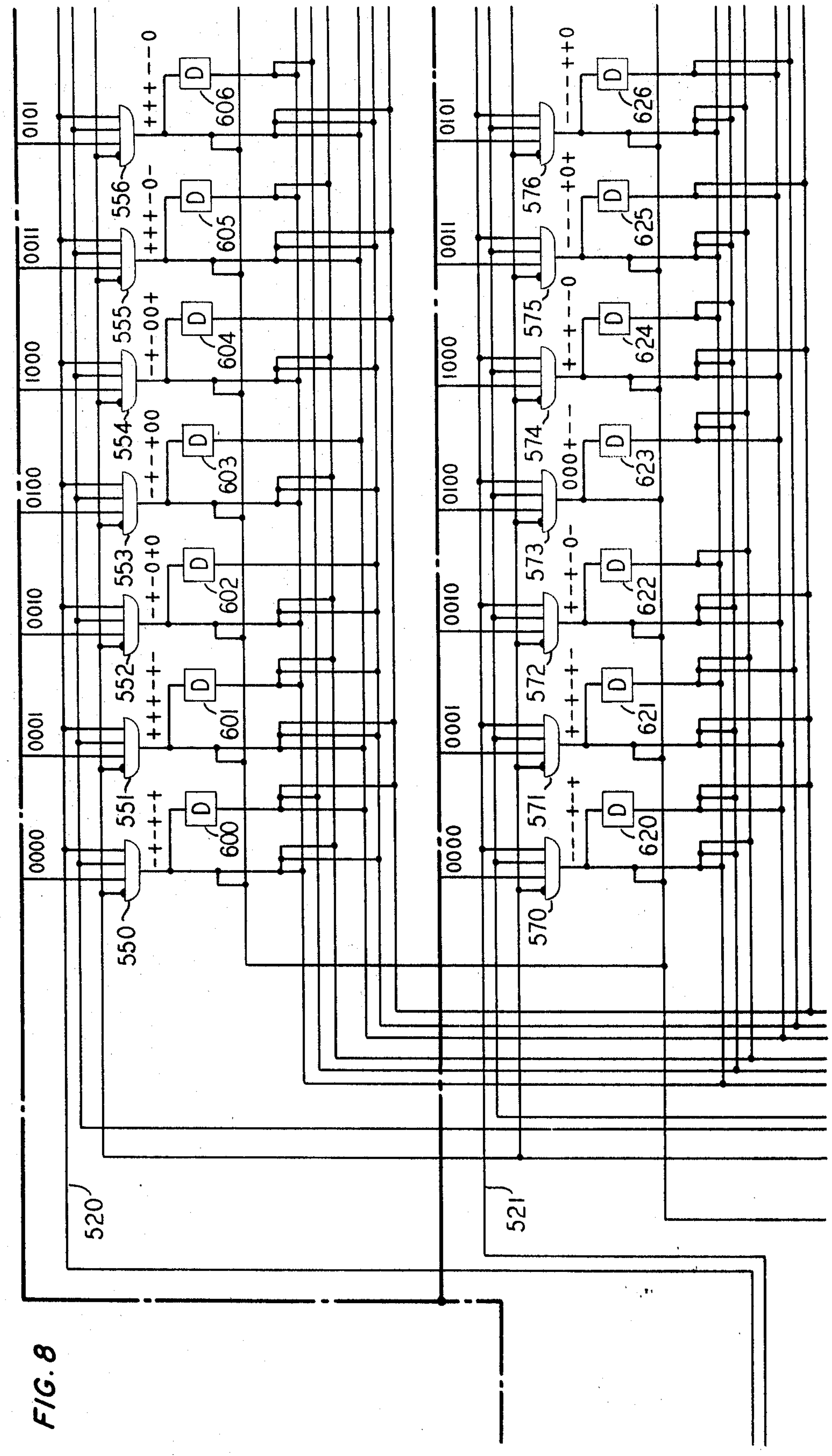
Figure 9:
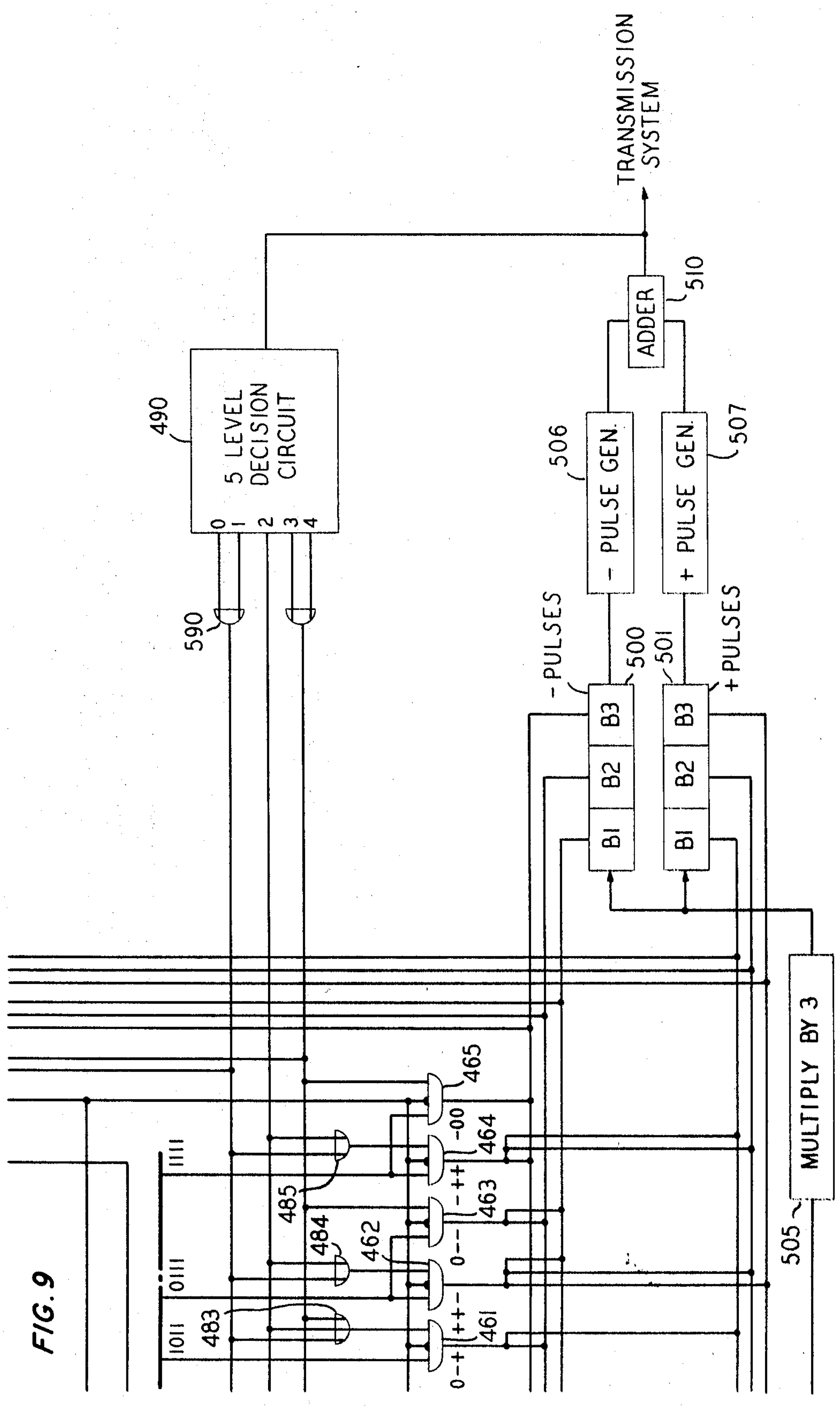
Figure 10:
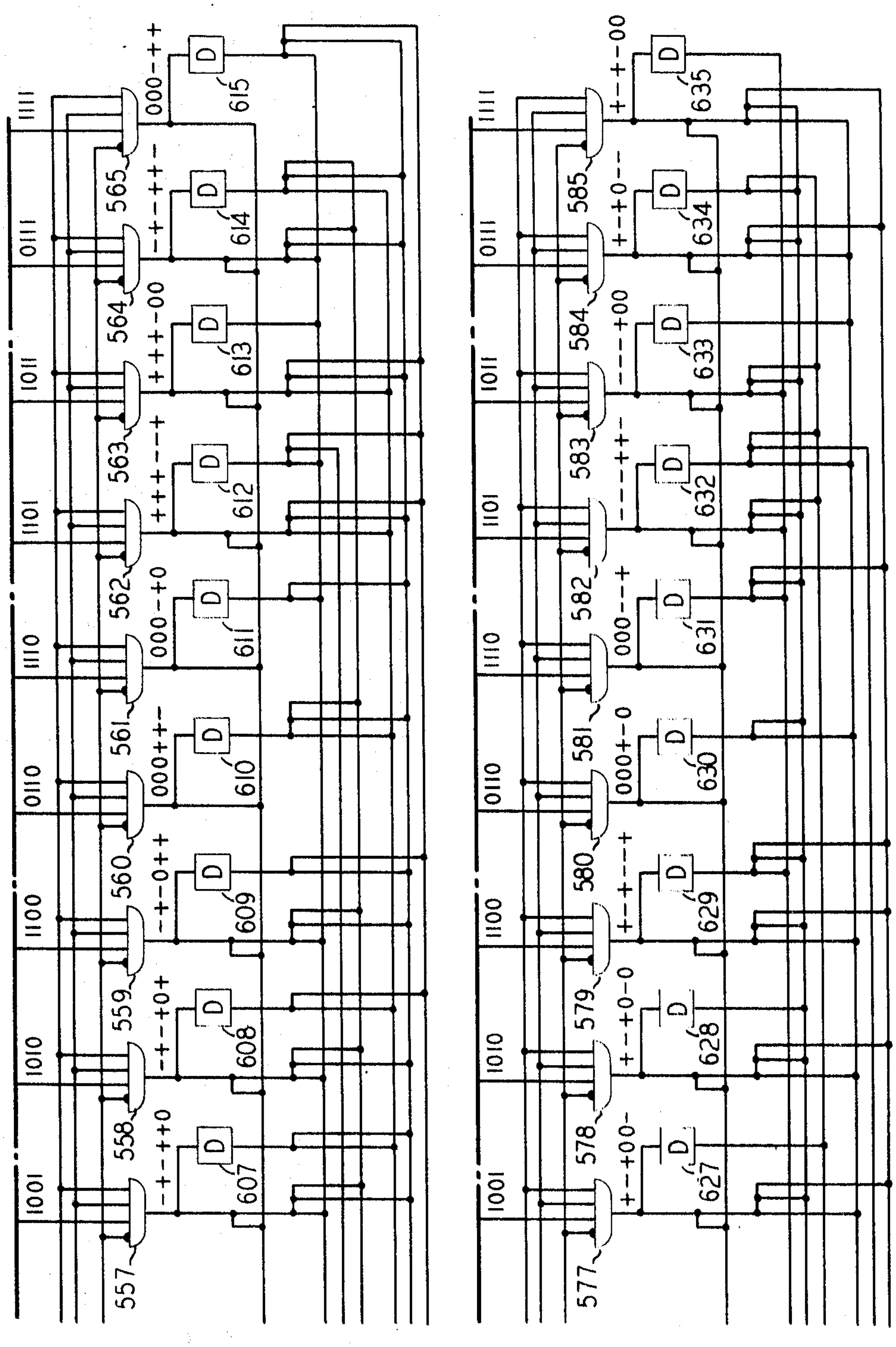

Thus, in accordance with the code in Table 3, incoming binary information is read into the B5 through B8 stages of register 401 and encoded under the control of gates 439, 440, 443 through 465, 470 through 485 to produce the proper output signals at the output of ADDER 510. The remaining apparatus shown in FIGS. 6, 8, and 9 is disabled at this time by the absence of an enabling signal on either terminal 520 or 521 of gate 439, indicating that the words 0000 or 0001 are stored in stage B5 through B8 of register 401.

The above-described operation continues so long as the word 0000 is not to be encoded in accordance with the $\beta$ alphabet shown in Table 3, and the word 0000 is not to be encoded in accordance with the $\alpha$ alphabet. Assuming that the words 0000 or 0001 are to be encoded in accordance with the alphabets $\beta$ and $\alpha$ respectively, then gates 439 generate an output signal at terminals 520 and 521, respectively, and these signals are applied to a series of gates 550 through 565 and 570 through 585, respectively. Gates 550 through 565 are enabled by reference voltages generated at either the "0" or "1" output terminals of decision circuit 490 which are applied to an OR gate 590 whose output terminal is connected to one input terminal of each of the gates 550 through 565. Since output terminal 520 of gates 439 which produces an output signal upon the occurrence of the word 0001 is connected to a second input terminal of each of those gates, these gates, 550 through 565, are enabled whenever the word 0001 is stored in the B5 through B8 stages of register 401. Similarly, gates 570 through 585 are enabled whenever the word 0000 is stored in stages B5 through B8 of register 401. The third input terminal of each of the gates 550 through 565, and 570 through 585, is connected to receive the signals generated by the gates 420 through 435 to gates 550 through 565 encode in accordance with the $\alpha$ alphabet in Table 4, and gates 570 through 585 encode in accordance with the $\beta$ alphabet of Table 4. Thus, for example, gate 552 produces an output signal when the word stored in the register 401 is 00010010. Similarly, gate 576, for example, generates an output when the word stored in the shift register 401 is 00000101. The output signal from gate 552 is applied to the B3 stage of register 500, the B1 stage of register 500 and the B2 stage of register 501. As a result, during the first three time slots, or bauds, of the transmitted signal, the signal transmitted on the line is +−+.

In order to generate the last 3 bauds of each such signal, delay circuits 600 through 615, and 620 through 635, each having a delay equal to 4 bauds of the transmitted signal are connected to the outputs of gates 550 through 565, and 570 through 585, respectively. These delay circuits serve to apply the output of the gate which is enabled to the appropriate stages of the shift registers 500 and 501 so that the second 3 bauds of the transmitted signal are properly developed. Thus, for example, with respect to gate 576 the proper output signal during these 3 bauds is ++0 and the output of gate 576 delayed by 4 bauds of the transmitted signal by delay circuit 626 is applied to the B2 and B3 stages of register 501 so that this signal applied to the transmission system during these three time slots is ++0, the "0" resulting from the fact that no signal is inserted into the B1 stage of each register 500 or 501.

In order to insure that no further encoding takes place after a group of two 4-bit binary words is encoded the output signals from all the gates 550 through 565 and 570 through 585 are applied to a delay circuit 650 which provides a delay equal to four time slots of the source 400 and then sets bistable circuit 651. The "1" output terminal of bistable circuit 651 is applied to an inhibit terminal of each of the gates 550 through 565 and 570 through 585 to prevent them from generating any output signal. In addition, the "1" output terminal of bistable circuit 651 is also applied to an inhibit terminal of each of the gates 440, 443 through 465, so that these gates are also disabled. After eight new bits from source 400 are read into register 401 the divide-by-four circuit 403 generates an output signal to reset bistable circuit 651 so that the above described coding operation can continue.

Figure 11:
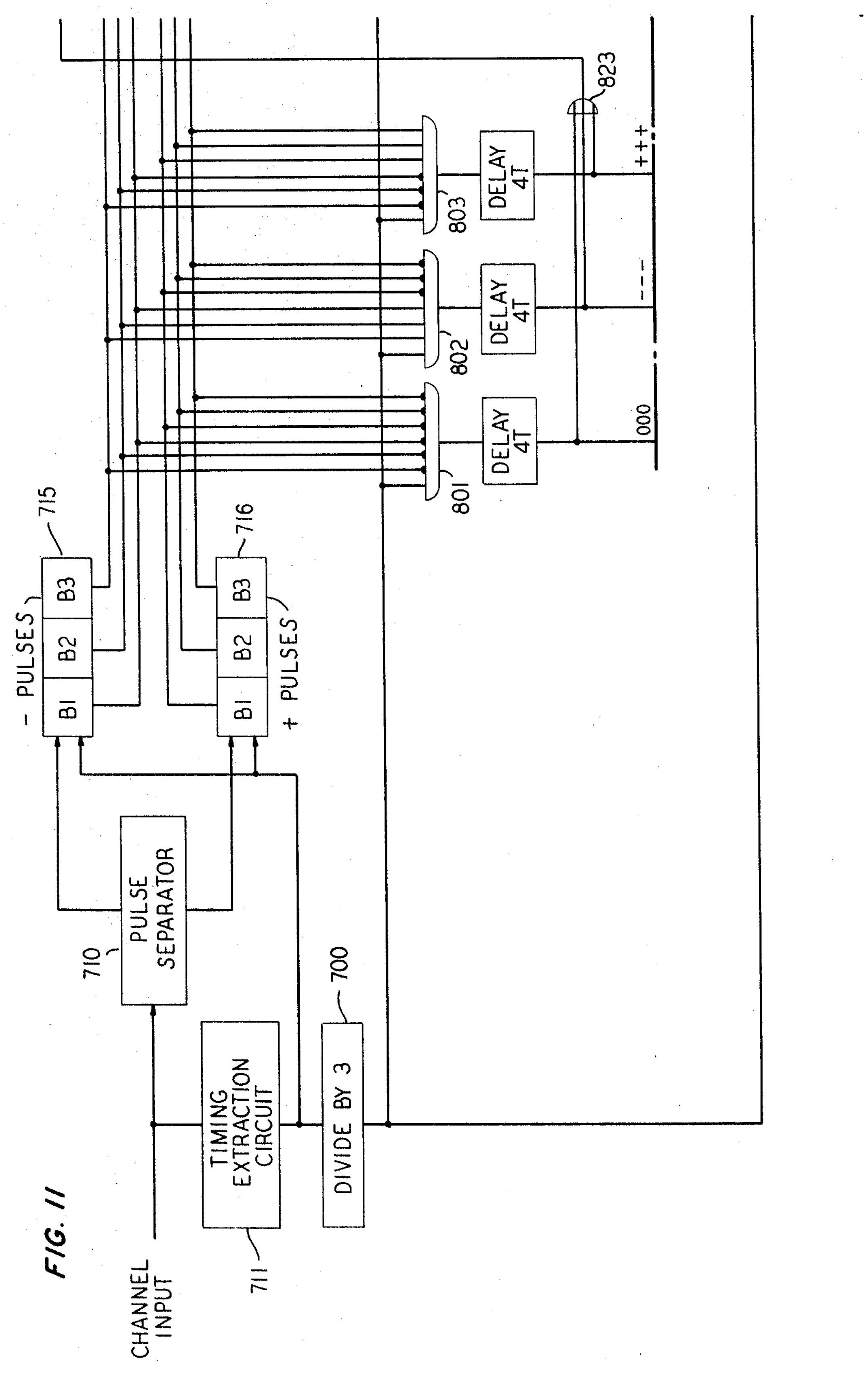
FIGS. 11, 12, 13, 14 and 15 taken together and arranged as shown in FIG. 23 are a receiving terminal of a transmission system embodying this invention wherein binary information is transmitted by means of variable-length code words.
Figure 12:
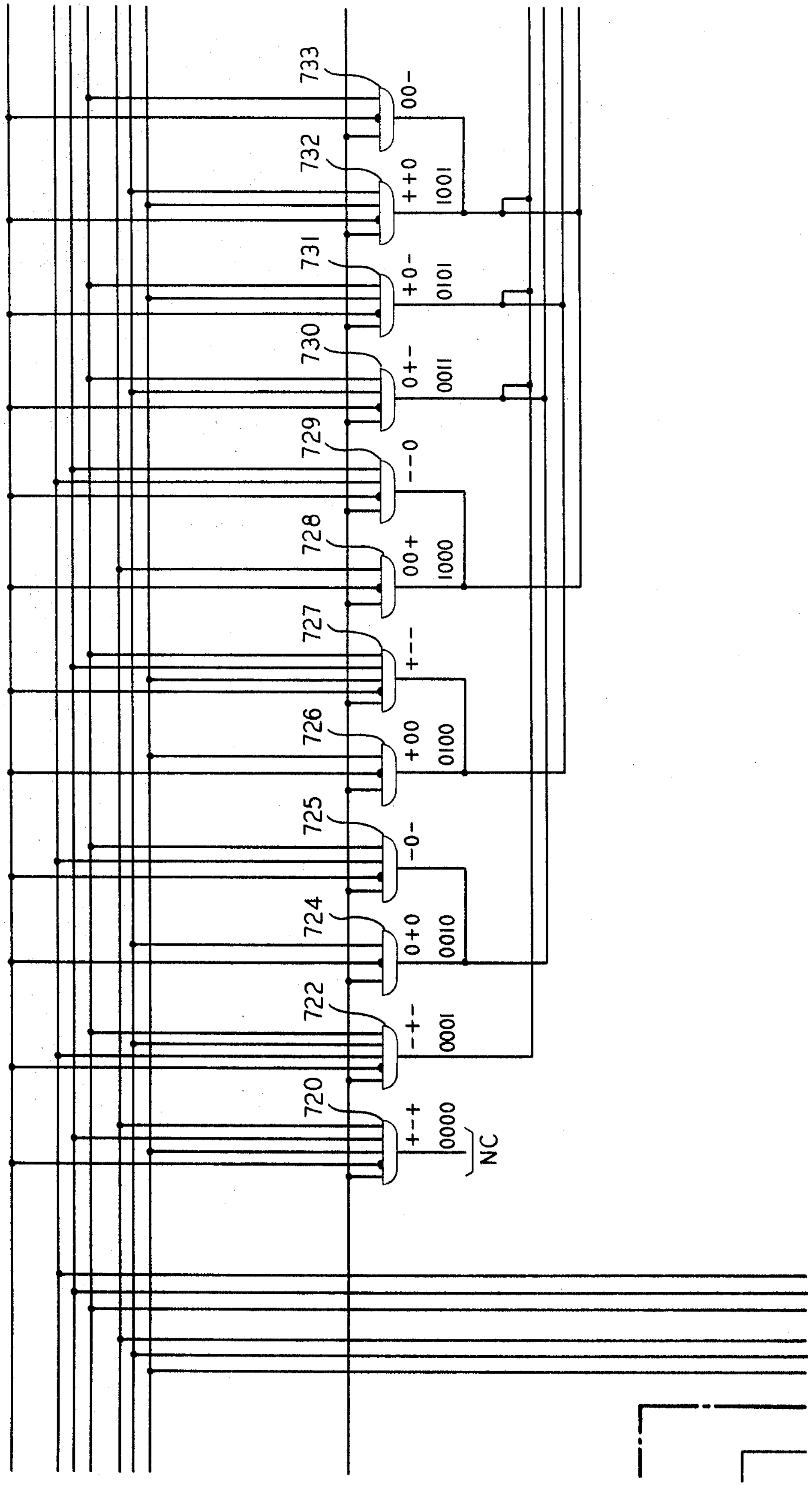
Figure 13:
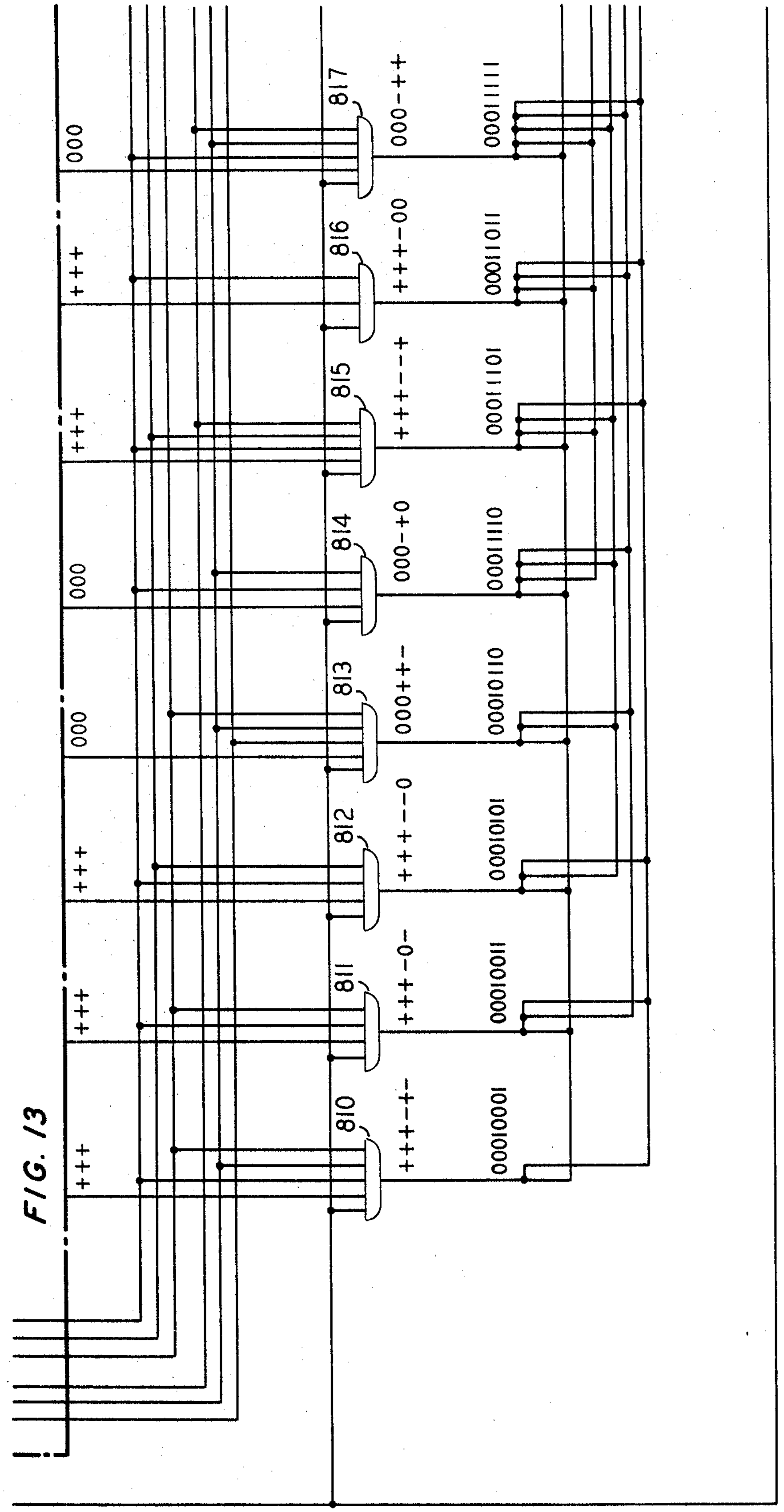
Figure 14:
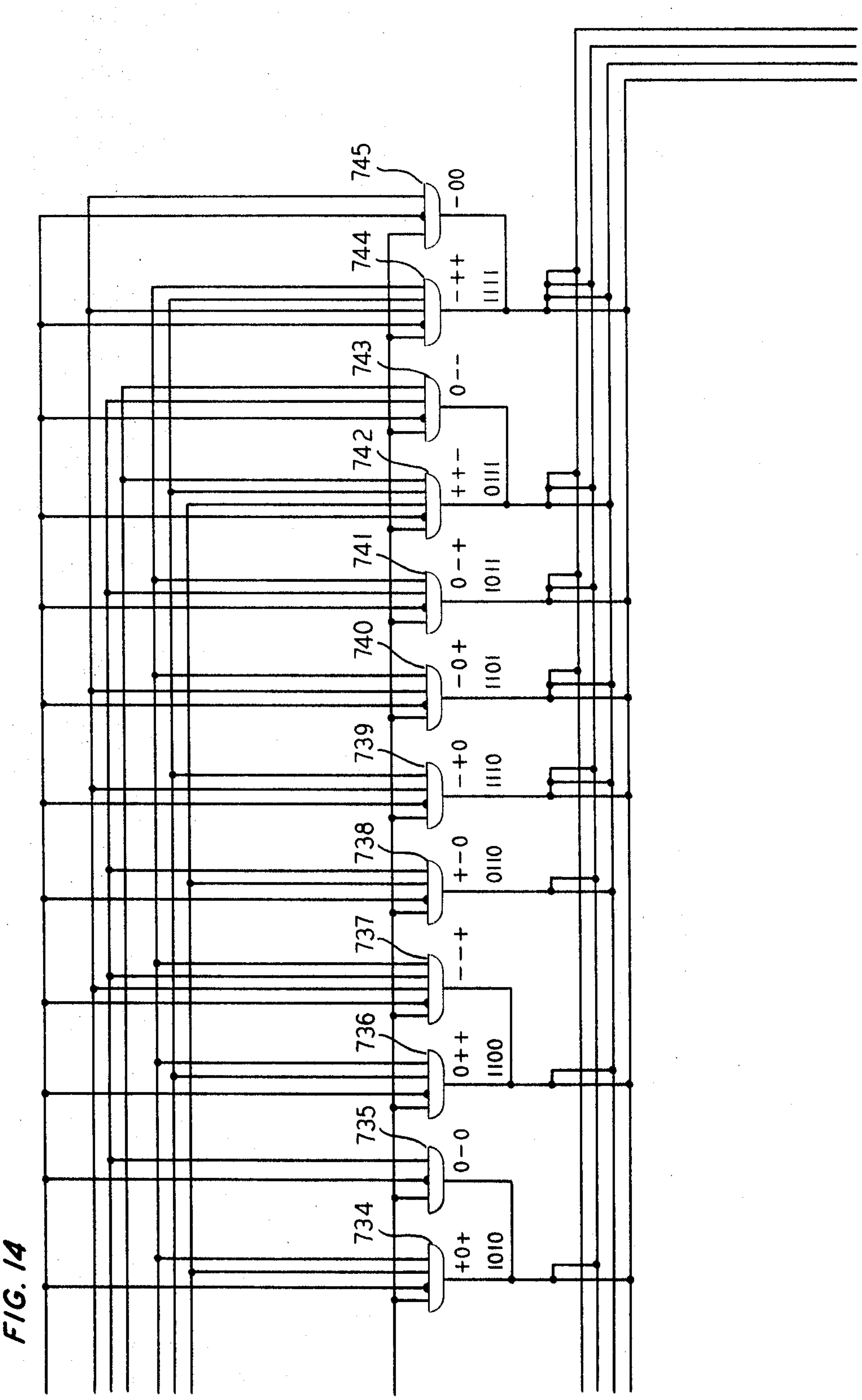
Figure 15:
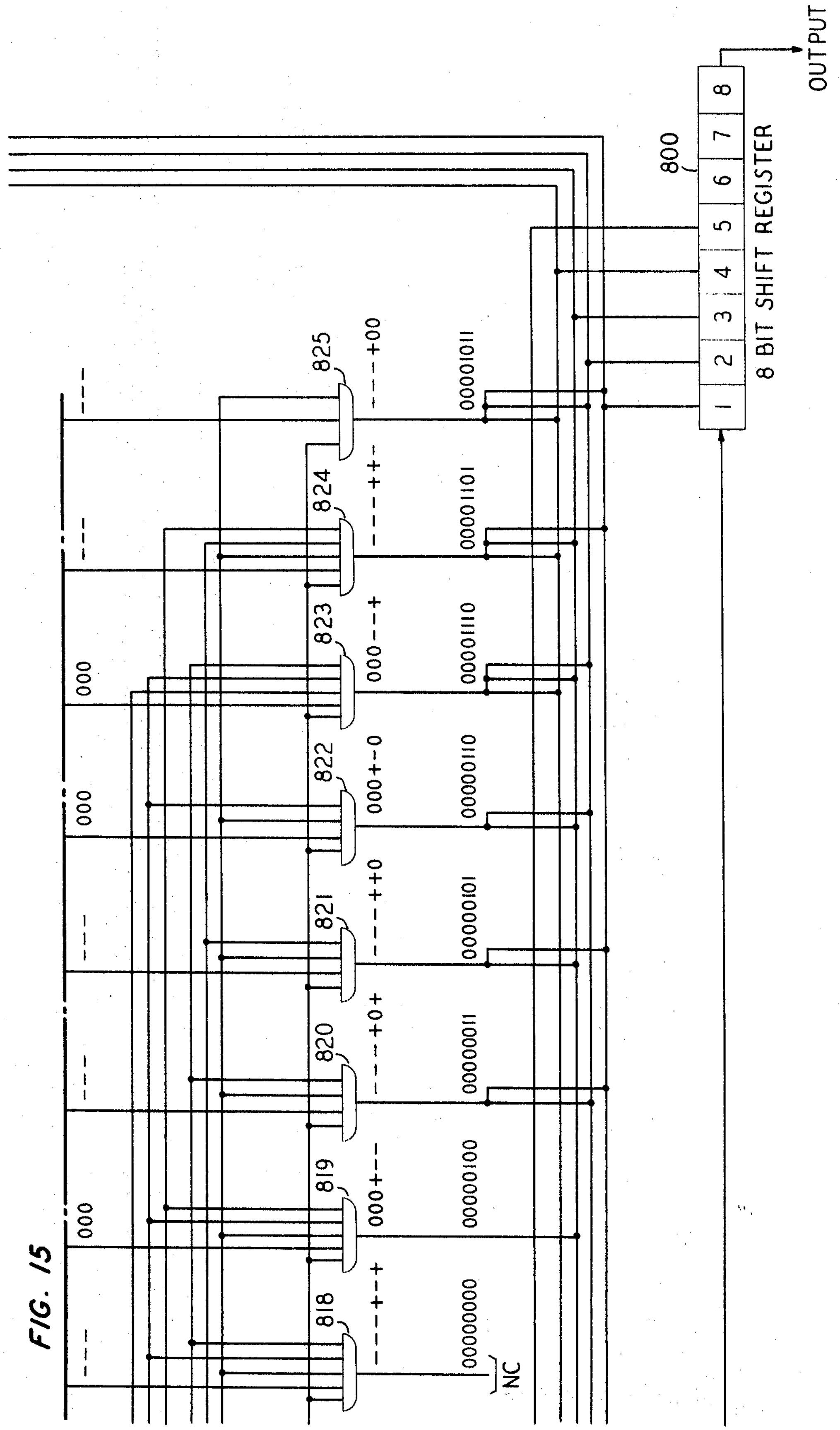
Figure 23:
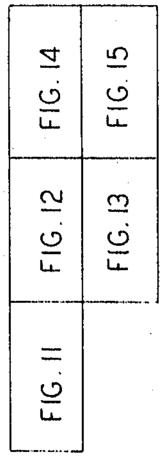
Figure 24:
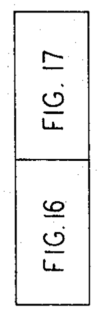

The receiving terminal for the variable length code is shown in FIGS. 11, 12, 13, 14 and 15, with the FIGS. arranged as shown in FIG. 23. A large portion of the apparatus shown in FIGS. 11, 12 and 14 is identical to that shown in FIGS. 4 and 5 and such corresponding apparatus bears reference numerals 600 units higher. Thus, for example, register 715 corresponds to register 115 in FIG. 4 and gate 720 corresponds to gate 120. When the transmitted signals correspond to those shown in the alphabets shown in Table 3, gates 720, 722 and 724 through 745 serve to insert signals into the first four stages of an 8-bit shift register 800 which corresponds to the binary equivalents of the code words shown in Table 3. Gates 121 and 123 in FIG. 4 have no equivalent in the gates shown in FIG. 12 and 14 since those gates generated output signals when the 3-baud received word was −−− and +++, respectively. As stated above these 3-baud words are not transmitted to represent a corresponding 4-bit binary equivalent but are only transmitted as the initial part of a 6-baud code word representing eight binary bits. Referring to Table 4, it can be seen that most of the words in the α and β alphabets are begun with the 3-baud sequence +++, −−− and 000. These signals are detected by inhibit gates 801, 802, and 803, respectively. None of the gates 720, 722, 724 through 745 are enabled by the occurrence of the 3-baud word 000, or −−−, or +++. Thus, upon receipt of such a sequence no signal is inserted into the 4-bit shift register by those gates. Rather, the occurrence of these signals enables, after a delay of four time slots of the input signal, one of a series of AND gates 810 through 825. For example, when gate 803 generates an output signal, gates 810, 811, 812, 815 and 816 are enabled after four time slots, while gates 720, 722, 724 through 745 are disabled by the output signal from gate 803 delayed by four time slots and applied through an OR gate 823 to an inhibit terminal of each of those gates. Depending upon the nature of the pulse signal stored in registers 715 and 716 during these second four bits of the received code word, one of gates 810, 811, 812, 815 and 816 is enabled. For example, if the transmitted signal was +++ −−+, then the binary equivalent, in accordance with Table 4, was 00011101 and AND gate 815 will generate an output pulse which is applied to the fifth, fourth, third and first stages of register 800 such that the word read out of register 800 is 00011101. If the second group of 3 bauds of the transmitted 6-baud word had been −−0 then AND gate 812 would generate an output signal which is applied to the fifth, third, and first stages of shift register 800 so that the word read out of the register would be 00010101. The operation of the rest of the gates shown in FIGS. 13 and 15 proceeds in similar fashion.

Thus, in accordance with this invention a whole host of codes may be devised in order to accommodate the various requirements of the transmission system. Many of these possible requirements have already been discussed in the "-Background of the Invention" above. While two particular fixed length codes and one variable length code and the apparatus for accomplishing transmission in accordance therewith have been discussed in detail, it should be recognized that many other such codes embodying this invention could also be employed to satisfy other requirements. It should be recognized, therefore, that the above-described embodiments are merely illustrative of the applications of the principles of the invention, and that numerous other embodiments may be devised by those skilled in the art without departing from the scope of the invention.

What I claim is:

1. Apparatus for converting binary signals into pulse signals having a plurality of possible signal levels greater than two comprising, in combination, means to divide the binary pulse signals into words of a plurality of bits, means to convert said binary words into multilevel signals in accordance with a first alphabet of a predetermined code, means to measure a predetermined characteristic of said multilevel signals, means to convert said binary words into multilevel signals in accordance with a second predetermined code alphabet when said measuring means indicates the occurrence of a first predetermined measure of said predetermined characteristic, means to convert said binary words into multilevel signals in accordance with a third predetermined code alphabet when said measuring means indicates that occurrence of a second predetermined measure of said predetermined characteristics, means responsive to the occurrence of predetermined binary words at the output of said dividing means when said measuring means indicates the occurrence of a predetermined one of said predetermined measures of said predetermined characteristics to inhibit said conversion of binary words into multilevel signals until a following binary word is produced by said dividing means, and means to encode said two binary words into multilevel signals.

2. Apparatus in accordance with claim 1 wherein said binary pulse signals are divided into words of four bits and said three code alphabets are:

| | Alphabet for coder state | | |
|---|---|---|---|
| Binary equivalent | α | μ | β |
| 0000 | +−+ | +−+ | |
| 0001 | | −+− | −+− |
| 0010 | 0+0 | 0+0 | 0−0 |
| 0100 | +00 | +−− | +−− |
| 1000 | 00+ | 00+ | −−0 |
| 0011 | 0+− | 0+− | 0+− |
| 0101 | +0− | +0− | +0− |
| 1001 | ++0 | 00− | 00− |
| 1010 | +0+ | 0−0 | 0−0 |
| 1100 | 0++ | −−+ | −−+ |
| 0110 | +−0 | +−0 | +−0 |
| 1110 | −+0 | −+0 | −+0 |
| 1101 | −0+ | −0+ | −0+ |
| 1011 | 0−+ | 0−+ | 0−+ |
| 0111 | ++− | ++− | 0−− |
| 1111 | −++ | −++ | −00 |

and said means to encode said two binary words into multilevel signals operate in accordance with the following code:

| When first four bits are 0001 binary equivalent | α | When first four bits are 0000 binary equivalent | β |
|---|---|---|---|
| 00010000 | −+−+−+ | 00000000 | −−−+−+ |
| 00010001 | +++−+− | 00000001 | +−+−+− |
| 00010010 | −+−0+0 | 00000010 | +−+−0− |
| 00010100 | −+−+00 | 00000100 | 000+−− |
| 00011000 | −+−00+ | 00001000 | +−+−−0 |
| 00010011 | +++−0− | 00000011 | −−−+0+ |
| 00010101 | +++−−0 | 00000101 | −−−++0 |
| 00011001 | −+−++0 | 00001001 | +−+00− |
| 00011010 | −+−+0+ | 00001010 | +−+0−0 |
| 00011100 | −+−0++ | 00001100 | +−+−−+ |
| 00010110 | 000++− | 00000110 | 000+−0 |
| 00011110 | 000−+0 | 00001110 | 000−−+ |
| 00011101 | +++−−+ | 00001101 | −−−++− |
| 00011011 | +++−00 | 00001011 | −−−+00 |
| 00010111 | −+−++− | 00000111 | +−+0−− |
| 00011111 | 000−++ | 00001111 | +−+−00 |

3. Apparatus for converting binary signals into pulse signals having a plurality of possible signal levels greater than two comprising, in combination, means to divide the binary pulse signals into words of four bits, means to convert said binary words into multilevel signals in accordance with a first alphabet of a predetermined code, means to measure the direct current level of said multilevel signals, means to convert said binary words into multilevel signals in accordance with a second predetermined code alphabet when the direct current level of said multilevel signal is at a first predetermined level, means to convert said binary words into multilevel signals in accordance with a third predetermined code alphabet when the direct current level of said multilevel signal is at a second predetermined level, said four bit words of binary pulse signals and said three code alphabets being as follows:

| | Alphabets | | |
|---|---|---|---|
| Binary equivalent | α | μ | β |
| 0000 | +−+ | +−+ | |
| 0001 | +++ | −+− | −+− |
| 0010 | 0+0 | 0+0 | −0− |
| 0100 | +00 | +−− | +−− |
| 1000 | 00+ | 00+ | −−0 |
| 0011 | 0+− | 0+− | 0+− |
| 0101 | +0− | +0− | +0− |
| 1001 | ++0 | 00− | 00− |
| 1010 | +0+ | 0−0 | 0−0 |
| 1100 | 0++ | −−+ | −−+ |
| 0110 | +−0 | +−0 | +−0 |
| 1110 | −+0 | −+0 | −+0 |
| 1101 | −0+ | −0+ | −0+ |
| 1011 | 0−+ | 0−+ | 0−+ |
| 0111 | ++− | ++− | 0−− |
| 1111 | −++ | −++ | −00 |

and means to convert said binary words into multilevel signals in accordance with said first code alphabet when the direct current level of said multilevel signal is at a third predetermined level.

4. Apparatus for converting binary signals into pulse signals having a plurality of possible signal levels greater than two comprising, in combination, means to divide the binary pulse signals into words of three bits, means to convert said binary words into multilevel signals in accordance with a first alphabet of a predetermined code, means to measure the direct current level of said multilevel signals, means to convert said binary words into multilevel signals in accordance with a second predetermined code alphabet when the direct current level of said multilevel signal is at a first predetermined level, means to convert said binary words into multilevel signals in accordance with a third predetermined code alphabet when the direct current level of said multilevel signal is at a second predetermined level, said three bit words of binary pulse signals and said three code alphabets being as follows:

| Binary | A | B | C |
|---|---|---|---|
| 000 | +1−1 | +1−1 | +1−1 |
| 001 | −1+1 | −1+1 | −1+1 |
| 010 | −3+3 | −3+3 | −3+3 |
| 100 | +3−3 | +3−3 | +3−3 |
| 011 | −3+1 | −3+1 | +3+1 |
| 101 | +1−3 | +1−3 | +1+3 |
| 110 | −3−1 | +3−1 | +3−1 |
| 111 | −1−3 | −1+3 | −1+3 |

and means to convert said binary words into multilevel signals in accordance with said first code alphabet when the direct current level of said multilevel signal is at a third predetermined level.